(12) United States Patent
Dorier et al.

(10) Patent No.: US 10,926,574 B2
(45) Date of Patent: Feb. 23, 2021

(54) SECURITY ELEMENT FORMED FROM AT LEAST TWO INKS APPLIED IN OVERLAPPING PATTERNS, ARTICLES CARRYING THE SECURITY ELEMENT, AND AUTHENTICATION METHODS

(71) Applicant: SICPA HOLDING SA, Prilly (CH)

(72) Inventors: Jean-Luc Dorier, Bussigny (CH); Benito Carnero, Preverenges (CH); Mia Milos-Schouwink, Vevey (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/063,684

(22) PCT Filed: Dec. 13, 2016

(86) PCT No.: PCT/EP2016/080784
§ 371 (c)(1),
(2) Date: Jun. 18, 2018

(87) PCT Pub. No.: WO2017/102722
PCT Pub. Date: Jun. 22, 2017

(65) Prior Publication Data
US 2019/0126660 A1    May 2, 2019

(30) Foreign Application Priority Data
Dec. 17, 2015  (EP) ..................... 15200956

(51) Int. Cl.
*G01N 21/64* (2006.01)
*B42D 25/378* (2014.01)
(Continued)

(52) U.S. Cl.
CPC ........... *B42D 25/378* (2014.10); *B41M 3/144* (2013.01); *B42D 25/382* (2014.10);
(Continued)

(58) Field of Classification Search
CPC ......... G01N 24/643; G01N 2021/6441; B42D 25/382; B42D 25/387; B42D 25/405;
(Continued)

(56) References Cited

U.S. PATENT DOCUMENTS 4,066,280 A * 1/1978 LaCapria ................. B41M 3/14
250/461.1
4,387,112 A * 6/1983 Blach ........................ G07F 7/08
283/901

(Continued)

FOREIGN PATENT DOCUMENTS

DE   60030730   9/2007
WO   2009010714   1/2009
(Continued)

OTHER PUBLICATIONS

International Search Report and Written Opinion issued with respect to application No. PCT/EP2016/080784, 15 pages.
(Continued)

*Primary Examiner* — David P Porta
*Assistant Examiner* — Djura Malevic
(74) *Attorney, Agent, or Firm* — Muncy, Geissler, Olds & Lowe, P.C.

(57) ABSTRACT

Security element including a first and second pattern formed by a first and second material respectively in or on a first and a second region of a substrate respectively, the first pattern partially overlapping with said second pattern, the first material comprising a first luminescent dye, which upon excitation by electromagnetic radiation falling within its excitation wavelength range emits electromagnetic radiation in a first emission wavelength range, the second material comprising a second luminescent dye, which upon excitation by electromagnetic radiation falling within its excitation wavelength range emits electromagnetic radiation in a sec-
(Continued)

Figure 1:
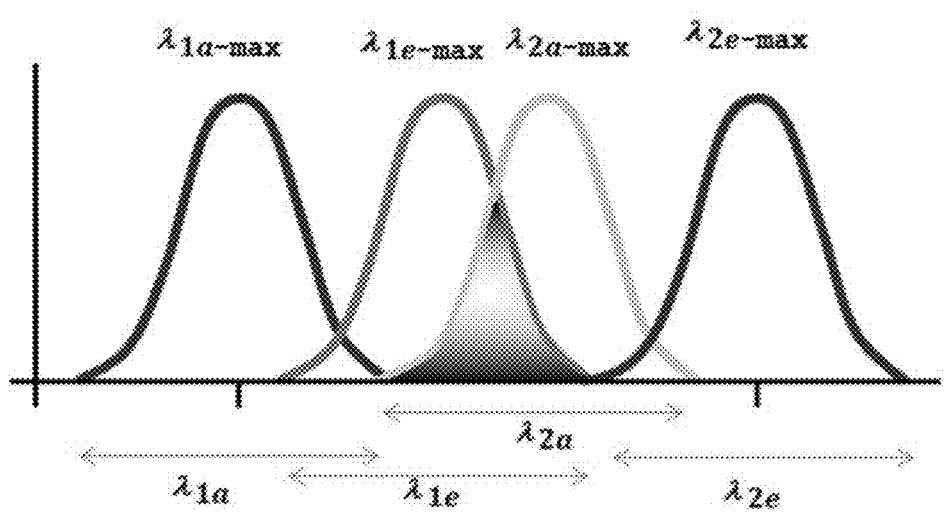

ond emission wavelength range, said first emission wavelength range overlapping with the excitation wavelength range of the second luminescent dye, so that upon irradiation within the excitation wavelength range of the first luminescent dye the second luminescent dye is excited, in the overlapping area of the patterns, to emit electromagnetic radiation in the emission wavelength range.

19 Claims, 11 Drawing Sheets

(51) Int. Cl.
| | | |
|---|---|---|
| B42D 25/382 | (2014.01) | |
| B42D 25/387 | (2014.01) | |
| G07D 7/0043 | (2016.01) | |
| G07D 7/1205 | (2016.01) | |
| C09D 11/037 | (2014.01) | |
| C09D 11/50 | (2014.01) | |
| G07D 7/20 | (2016.01) | |
| G07D 7/12 | (2016.01) | |
| C09D 11/101 | (2014.01) | |
| C09D 11/033 | (2014.01) | |
| C09D 11/30 | (2014.01) | |
| C09D 11/106 | (2014.01) | |
| B42D 25/405 | (2014.01) | |
| B41M 3/14 | (2006.01) | |
| C09D 11/54 | (2014.01) | |

(52) U.S. Cl.
CPC ......... *B42D 25/387* (2014.10); *B42D 25/405* (2014.10); *C09D 11/033* (2013.01); *C09D 11/037* (2013.01); *C09D 11/101* (2013.01); *C09D 11/106* (2013.01); *C09D 11/30* (2013.01); *C09D 11/50* (2013.01); *C09D 11/54* (2013.01); *G01N 21/643* (2013.01); *G07D 7/0043* (2017.05); *G07D 7/12* (2013.01); *G07D 7/1205* (2017.05); *G07D 7/20* (2013.01); *G01N 2021/6441* (2013.01); *G07D 2207/00* (2013.01)

(58) Field of Classification Search
CPC ...... G07D 7/0043; G07D 7/1205; G07D 7/20; G07D 7/12; C09D 11/03; C09D 11/50; C09D 11/101; C09D 11/033; C09D 11/30; C09D 11/106; C09D 11/54; B41M 3/14
See application file for complete search history.

(56) References Cited

U.S. PATENT DOCUMENTS

| | | | | |
|---|---|---|---|---|
| 5,354,099 | A * | 10/1994 | Kaule | B42D 25/355 |
| | | | | 283/85 |
| 5,388,862 | A * | 2/1995 | Edwards | D21H 21/42 |
| | | | | 283/82 |
| 6,036,232 | A * | 3/2000 | Kaule | B42D 25/328 |
| | | | | 283/85 |
| 6,808,542 | B2 | 10/2004 | Nguyen et al. | |
| 7,040,663 | B1 * | 5/2006 | Plaschka | B41M 3/148 |
| | | | | 235/493 |
| 7,079,230 | B1 | 7/2006 | McInerney et al. | |
| 7,357,077 | B2 * | 4/2008 | Adamczyk | B41M 1/10 |
| | | | | 101/150 |
| 7,449,698 | B2 * | 11/2008 | Nguyen | G01N 21/643 |
| | | | | 250/459.1 |
| 7,601,417 | B2 * | 10/2009 | Nakamura | B41M 3/14 |
| | | | | 427/7 |
| 7,611,168 | B2 * | 11/2009 | Heim | B42D 25/29 |
| | | | | 283/85 |
| 7,687,271 | B2 * | 3/2010 | Gelbart | G06K 19/086 |
| | | | | 436/56 |
| 7,960,688 | B2 * | 6/2011 | Agrawal | G06K 19/14 |
| | | | | 250/271 |
| 8,276,945 | B2 * | 10/2012 | Heim | B42D 25/351 |
| | | | | 283/91 |
| 8,840,029 | B2 * | 9/2014 | Lawandy | G01N 21/25 |
| | | | | 235/491 |
| 8,883,691 | B2 * | 11/2014 | True | G01N 33/54313 |
| | | | | 506/9 |
| 8,927,892 | B2 * | 1/2015 | Haushalter | G01N 21/643 |
| | | | | 209/587 |
| 9,291,559 | B2 * | 3/2016 | Hussain | G01N 21/643 |
| 9,409,434 | B2 * | 8/2016 | Kecht | C09K 11/7701 |
| 2002/0018430 | A1 * | 2/2002 | Heckenkamp | G06K 19/14 |
| | | | | 369/109.01 |
| 2003/0056688 | A1 * | 3/2003 | Muller | C09D 13/00 |
| | | | | 106/31.07 |
| 2003/0154647 | A1 | 8/2003 | Nguyen et al. | |
| 2004/0231554 | A1 | 11/2004 | Udagawa et al. | |
| 2005/0120907 | A1 | 6/2005 | Aoyama et al. | |
| 2008/0014378 | A1 * | 1/2008 | Hoffmuller | B05D 3/068 |
| | | | | 428/29 |
| 2008/0024771 | A1 * | 1/2008 | Crawford | C09D 11/50 |
| | | | | 356/230 |
| 2008/0116272 | A1 * | 5/2008 | Giering | G07D 7/1205 |
| | | | | 235/439 |
| 2009/0074231 | A1 * | 3/2009 | Rancien | D21H 21/40 |
| | | | | 382/100 |
| 2013/0147181 | A1 * | 6/2013 | Rosset | D21H 21/42 |
| | | | | 283/92 |
| 2013/0320099 | A1 * | 12/2013 | Acton | G06K 19/06056 |
| | | | | 235/494 |
| 2014/0065442 | A1 * | 3/2014 | Kingsley | C09K 11/77 |
| | | | | 428/690 |
| 2015/0298482 | A1 * | 10/2015 | Walter | B41F 19/02 |
| | | | | 359/572 |

FOREIGN PATENT DOCUMENTS

| | | |
|---|---|---|
| WO | 2013033009 | 3/2013 |
| WO | 2013050290 | 4/2013 |
| WO | 2014076049 | 5/2014 |

OTHER PUBLICATIONS

International Preliminary Report on Patentability (IPRP) issued with respect to application No. PCT/EP2016/080784, 25 pages.
D. L. Andrews, A Unified Theory of Radiative and Radiationless Molecular Energy Transfer; Chemical Physics 135 (1989) 195-201.
D.M. Sturmer, The Chemistry of Heterocyclic Compounds, vol. 30, John Wiley, New York, 1977, pp. 441-587.
J.B. Marling, J.H. Hawley, E.M. Liston, W.B. Grant, Applied Optics, 13(10), 2317-2320 (1974).

* cited by examiner a)

b)

c)

d)

a)

b)

c)

d)

Figure 8C:
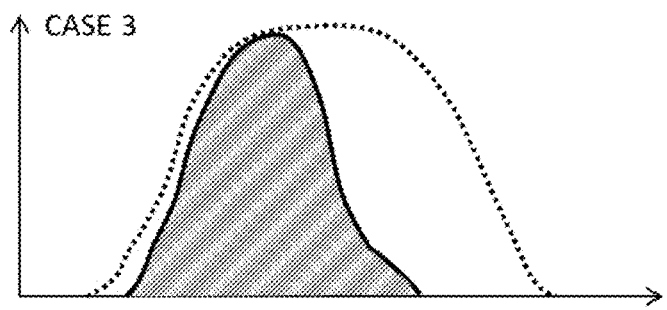

Figure 8
Figure 8a
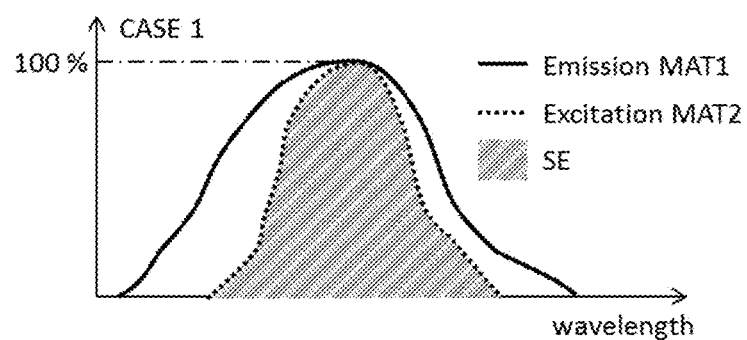
Figure 8b
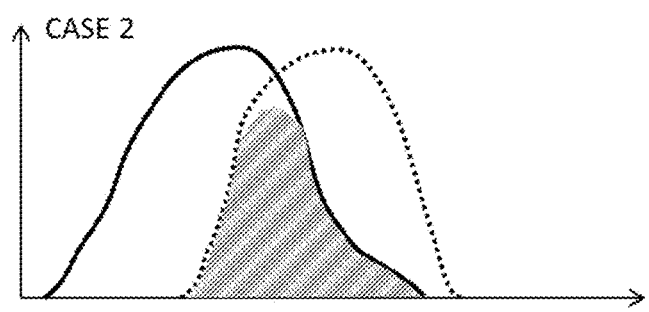

SECURITY ELEMENT FORMED FROM AT LEAST TWO INKS APPLIED IN OVERLAPPING PATTERNS, ARTICLES CARRYING THE SECURITY ELEMENT, AND AUTHENTICATION METHODS

The present invention concerns a security element comprising at least two patterns PAT1 and PAT2 formed from two inks INK1 and INK2, respectively. Each of INK1 and INK2 comprises a luminescent (i.e. fluorescent and/or phosphorescent) dye or pigment, whereof the one present in INK1 ("the donor") is capable of exciting the other present in INK2 ("the acceptor"), resulting in a cascade effect in terms of energy transfer in overlapping areas of PAT1 and PAT2. The present invention also relates to the use of this security element for authenticating articles, such as banknotes, value papers, identity documents, cards, tickets, labels, security foils, security threads and the like, articles being provided with the security element, and a method for the authentication of such articles.

1. BACKGROUND ART

The authentication of luminescent, in particular fluorescent, markers with imaging devices is commonly accomplished by imaging/observing the authentication mark in a certain spectral range (typically different from the range of excitation), followed by verifying that the authentication mark luminesces and presents a proper contrast against the background. This technique is well suited to validate the luminescence emission of the marking dye, and does so in a relatively broad wavelength range.

This approach has the drawback that the emission spectra of common markers (e.g. fluorescent dyes and pigments) can either be known in advance or can be easily determined. The fluorescence emission of a marking dye with a broad wavelength range can be simulated by a counterfeiter by using one or more fluorescent dyes having similar emission properties, thereby mimicking the genuine marker. Therefore, in terms of authentication, this method cannot be considered as reliable, since other marking dyes emitting in a close range may provide enough contrast to be considered as genuine.

A more reliable authentication of luminescent marks with imaging devices can be achieved by exploiting the spectral properties of the emitted light, i.e. by analyzing the emission spectrum in the visible spectrum or in other spectral ranges, such as UV and IR. With a standard imaging sensor, performing multi (or hyper) spectral imaging, e.g. in the NIR (near infrared range) range, would require techniques such as: (1) custom Bayer-like filters (involving expensive developments) (2) Fabry-Perot configurations (currently bulky and fairly expensive), (3) complex cameras using AOTF (Acousto-Optic Tunable Filters, which also bulky and expensive), (4) switchable band-pass interference filters (with inconvenient moving parts), or (5) imaging spectrographs requiring push-brooms (unsuitable for handheld readers). Thus, the finer analysis of spectral properties generally requires complex, bulky and expensive equipment, and is difficult to implement in handheld devices or widely distributed authentication equipment.

Another means to achieve a more reliable authentication is a spectrometer. However, this device does not provide an image of the mark, making it unsuitable for code reading or geometrical checks of the printed mark.

U.S. Pat. No. 7,079,230 B1 relates to authentication devices and methods and, more particularly, to portable hand-held device and a method for authenticating products or product packaging. In one embodiment of this patent document, a method of selecting a light-sensitive compound for application to a substrate and subsequent detection on the substrate is disclosed. The method includes irradiating the substrate with light, sensing an emission spectrum of the substrate in response to the irradiation, determining at least one peak wavelength of light within the emission spectrum, and selecting a light-sensitive compound that emits or absorbs light at a first wavelength in response to the irradiating light wherein the first wavelength is different from the at least one peak wavelength. In another embodiment, a method of authentication is described which includes producing an ink containing a first compound that emits light at a first discreet wavelength and a second compound that emits light at a second discreet wavelength, printing a readable image on a substrate with the ink, detecting a ratio of the first compound with the second compound on the substrate, indicating whether the ratio is within a range and reading the image. In one embodiment, one or more light-sensitive compounds, such as, for example, one or more fluorescent light-emissive compounds, is mixed with ink to be printed on a product or a product package. The system of this reference document requires the measurement of at least two different emission peaks and consequently requires a measuring device that contains two separate detectors, one for each emission peak.

WO 2013/050290 A1 describes a method for the automatic examination of the authenticity of value-indicating stamps and indicia comprising a luminescent area, the stamp or indicium being applied to the surface of a mail item. The surface of the item is irradiated with light of a wavelength of spectral range, a first image of the surface of the item is recorded by means of a camera system and said first image is evaluated with respect to the location of stamps or indicia applied thereto on the surface of the item. A comparison of evaluation of the image sections or image sections with stored luminescence patterns will lead, when these match, to a decision on the authenticity of every stamp or indicium.

2. PROBLEMS TO BE SOLVED BY THE PRESENT INVENTION

The emission spectra of commercially available markers (dyes or pigments) are well documented and furthermore can be measured by a counterfeiter that suspects them to be used to protect the authenticity of an article. Even if two or more dyes or pigments have been used in combination, e.g. for forming two patterns on a substrate, counterfeiters may purchase these and prepare a corresponding mixture thereof, in order to mimic the security mark of an article. The present invention thus aims at providing a harder to counterfeit security element. In a separate or additional aspect, the security element should be relatively easy to identify as genuine, preferably not requiring the use of bulky and/or complicated equipment.

In addition, the present invention aims at providing a security element that creates a distinct visual effect observable under certain viewing or illumination conditions.

Further, it would be advantageous if the new security element and its authentication method can be realized by using printing inks, as this allows the printing of fine designs such as logos and images obtainable by printing inks, but hardly accessible with other methods. The use of printing inks thus allows the incorporation or realization of the security element in a shape (e.g. logo, design) that is attractive to an observer, and further allows the combination of the security element with information that can e.g. be item-specific, such as in a barcode or serial code.

The invention also aims at providing a highly secure photo-physical link between a pre-printed label or package and a subsequently provided item-specific element, such as a serialization digital code, Barcode or Datamatrix.

3. SUMMARY OF THE INVENTION

The present invention solves these problems by the combined use of two inks INK1 and INK2, which respectively comprise a specifically selected luminescent dye or pigment (donor and acceptor, respectively) capable of transferring energy from the donor to the acceptor, i.e. by a cascade effect, and an excitation-based authentication method.

The present invention accordingly provides

1. Security element comprising a first and a second pattern PAT1 and PAT2 formed in or on a substrate,
   the first pattern PAT1 being formed by a first material INK1 applied to a first region of the substrate,
   the second pattern PAT2 being formed by a second material INK2 applied to a second region of the substrate, said first and second regions of the substrate overlapping,
   wherein
   a part of the first pattern PAT1 overlaps with a part of said second pattern PAT2,
   the first material INK1 comprises a first luminescent dye or pigment DYE1, which upon excitation by electromagnetic radiation falling within an excitation wavelength range $\lambda 1a$ of the first luminescent dye or pigment DYE1 is capable of emitting electromagnetic radiation in at least one first emission wavelength range $\lambda 1e$, and
   the second material INK2 comprises a second luminescent dye or pigment DYE2, which upon excitation by electromagnetic radiation falling within an excitation wavelength range $\lambda 2a$ of the second luminescent dye or pigment DYE2 is capable of emitting electromagnetic radiation in at least one second emission wavelength range $\lambda 2e$, and
   said first emission wavelength range $\lambda 1e$ of the first luminescent dye or pigment DYE1 overlaps with the excitation wavelength range $\lambda 2a$ of the second luminescent dye or pigment DYE2, so that upon irradiation with electromagnetic radiation within the excitation wavelength range $\lambda 1a$ of the first luminescent dye or pigment DYE1 the second luminescent dye or pigment DYE2 is excited, in the area of overlap of the patterns, to emit electromagnetic radiation in the emission wavelength range $\lambda 2e$.
2. Security element according to item 1, wherein the first material INK1 comprises one or both of a first dye and a first pigment other than DYE1, and the second material comprises one or both of a second dye and a second pigment other than DYE2.
3. Security element according to item 1 or 2, wherein one or more of the dyes and pigments present in the first and second materials other than DYE1 and DYE2 are fluorescent and/or phosphorescent.
4. Security element according to one of items 1 to 3, wherein at least one of the first and second patterns is not visually distinguishable from the substrate.
5. Security element according to item 4, wherein one of the first pattern and the second pattern is not visually distinguishable from the substrate and the other of the first pattern and the second pattern is visually distinguishable from the substrate.
6. Security element according to any one of items 1 to 5, wherein at least one of the first and second patterns is placed randomly.
7. Security element according to any of items 1 to 6, wherein the second emission wavelength range $\lambda 2e$ does or does not overlap with the first emission wavelength range $\lambda 1e$.
8. Security element according to any one of items 1 to 7, wherein $\lambda 1a$-max<$\lambda 1e$-max<$\lambda 2e$-max, wherein $\lambda 1a$-max, $\lambda 1e$-max, and $\lambda 2e$-max denote the wavelengths of the excitation and emission peaks in the respective excitation and emission wavelength regions of DYE1 and DYE2.
9. Security element according to any one of items 1-8, wherein at least one of the patterns is randomly obtained by spraying INK1 and/or INK2.
10. Security element according to any one of items 1-9, wherein DYE1 and DYE2 are both fluorescent materials, preferably fluorescent dyes.
11. Commercial good or value document, comprising the security element according to any one of items 1 to 10.
12. Process for producing a security element as defined in any of items 1 to 10, comprising the steps of
    forming the first pattern by applying of the first material INK1 over the first region of the substrate,
    forming the second pattern by applying the second material INK2 over the second region of the substrate, said first and second regions of the substrate overlapping, wherein a part of the first pattern overlap with a part of said second pattern.
13. Process for producing a security element according to item 12, wherein the steps of forming the first pattern and/or the second pattern involve the application of INK1 and/or INK2 by a process selected from inkjet printing, offset printing, flexographic printing, lithographic printing, screen printing, gravure printing, intaglio printing and spraying.
14. A method for authenticating a marking including a security element according to one of items 1 to 10, comprising the steps of:
    irradiating the security element with electromagnetic radiation having a wavelength within the wavelength range $\lambda 1a$
    analyzing an electromagnetic radiation response within the wavelength range $\lambda 2e$ originating from an area of the security element of said marking wherein a part of PAT1 overlaps with a part of PAT2,
    determining whether said radiation response fulfills a predetermined criterion associated with a cascade effect according to which excitation in the excitation wavelength range $\lambda 1a$ of DYE1 causes emission in the emission wavelength range $\lambda 2e$ of DYE2, and
    deciding that said marking is authentic if said predetermined criterion is fulfilled.
15. A method according to item 14, comprising determining an intensity value associated with said emission wavelength range $\lambda 2e$ of said DYE2.
16. A method according to item 14 or 15, wherein said marking is irradiated with electromagnetic radiation of a first wavelength and with electromagnetic radiation of a second wavelength different from said first wavelength, and said predetermined criterion is associated with a relative intensity between a response in the emission wavelength range $\lambda 2e$ of DYE2 at the first wavelength and at the second wavelength.

17. A method according to any one of items 14 to 16, further comprising comparing an electromagnetic radiation response from said area of overlap with an electromagnetic radiation response from a different area than said area of overlap.
18. A method according to item 17, wherein said different area is an area belonging to one of said first pattern PAT1 and said second pattern PAT2.
19. A system for authenticating a marking for deciding whether said marking is an authentic security element according to one of items 1 to 10, said system comprising:
   an electromagnetic radiation source for irradiating said marking with electromagnetic radiation comprising a wavelength within the range λ1a,
   an analyzer for analyzing an electromagnetic radiation response from said marking in a wavelength range comprising λ2e and determining whether said radiation response fulfills a predetermined criterion associated with a cascade effect according to which excitation in the excitation wavelength range λ1a of the first luminescent dye or pigment DYE1 causes emission in the emission wavelength range λ2e of the second material INK2, and
   an authenticator for deciding that said marking is authentic if said predetermined criterion is fulfilled.
20. Ink set comprising at least two inks, which are the INK1 and the INK2 as defined in any of the preceding items.

Further aspects and preferred embodiments of the present invention will become more apparent from the following description.

Definitions

For the purposes of the present invention, the term "at least one" means one or more, preferably one, two, three, four, five, six or seven, more preferably one, two, three, four, or five, even more preferably one, two, or three, and most preferably one or two. The same applies to the term "one or more". Further, the terms "two or more" or "at least two" denote that minimum two of the recited components be present, but allows for the presence of further types of the same component, such as three, four, five, six or seven, more preferably two, three, four, or five, even more preferably two or three, and most preferably two.

If, in the present description, an embodiment, feature, aspect or mode of the invention is stated to be preferred, it should be understood that it is preferred to combine the same with other preferred embodiments, features, aspects or modes of the invention, unless there are evident incompatibilities. The resulting combinations of preferred embodiments, features, aspects or modes are part of the disclosure of the present description.

The term "comprising" is used open-endedly. Accordingly, e.g. a composition "comprising" a certain component may contain other components in addition. The term however also includes the meanings of "consisting of" and "consisting essentially of", as far as this is technically possible.

The term "ink" shall denote any material in liquid or viscous form that can be used in a printing, stamping or spraying process. The inks used in the present invention can be suitably selected from screen printing inks, gravure printing inks, inkjet inks, intaglio printing inks, bar coater inks, offset printing inks stamping ink, glue, spraying ink, varnishes.

"Visible range" means from 400 to 700 nm, "UV range" from 40 to less than 400 nm and "IR range" from more than 700 nm to 2400 nm.

"Fluorescence" denotes the emission of electromagnetic radiation from an excited state of a material having a lifetime τ of less than $10^{-5}$ seconds in terms of exponential decay according to $$e^{-\frac{t}{\tau}},$$

where t denotes time in seconds.

"Phosphorescence" denotes the emission of electromagnetic radiation from an excited state of a material having a lifetime τ of $10^{-5}$ seconds or longer in terms of exponential decay according to $$e^{-\frac{t}{\tau}},$$

where t denotes time in seconds.

The terms "luminescence" and "luminescent" are used to jointly refer to phosphorescence and fluorescence, and to phosphorescent and fluorescent, respectively. A luminescent material can thus be either fluorescent or phosphorescent, and in some cases can be both fluorescent and phosphorescent, as well known to a skilled person. Luminescence consequently denotes fluorescence and/or phosphorescence.

A partial spatial overlap is characterized by an area in or on a substrate wherein, when seen from an axis extending perpendicular to the plane of the substrate, there are three areas recognizable under certain viewing conditions: An area wherein PAT1, but not PAT2 is provided, an area wherein PAT2, but not PAT1 is provided, and an area wherein both PAT1 and PAT2 are provided. The certain viewing conditions may in some embodiments include only wavelengths of the visible range, but may in other embodiments also include or consist of wavelengths in the UV and/or IR range.

A full spatial overlap is characterized by an area wherein both PAT1 and PAT2 are provided. There may be one or more areas wherein additionally only PAT1 or, alternatively, only PAT2 is provided, as long as there are no two or more areas wherein only PAT1 and only PAT2, respectively, are provided.

In the present invention, all properties relate to those at 20° C. and standard pressure ($10^5$ Pa), unless stated differently.

4. BRIEF DESCRIPTION OF THE FIGURES

FIG. 1 schematically illustrates the excitation (a) and emission (e) peaks $\lambda_{1a\text{-}max}$, $\lambda_{1e\text{-}max}$, $\lambda_{2a\text{-}max}$ and $\lambda_{2e\text{-}max}$ of the two luminescent dyes comprised in the inks according to the present invention, as well as the respective excitation and emission wavelength ranges $\lambda_{1e}$, $\lambda_{1a}$, $\lambda_{2a}$ and $\lambda_{2e}$.

Figure 2:
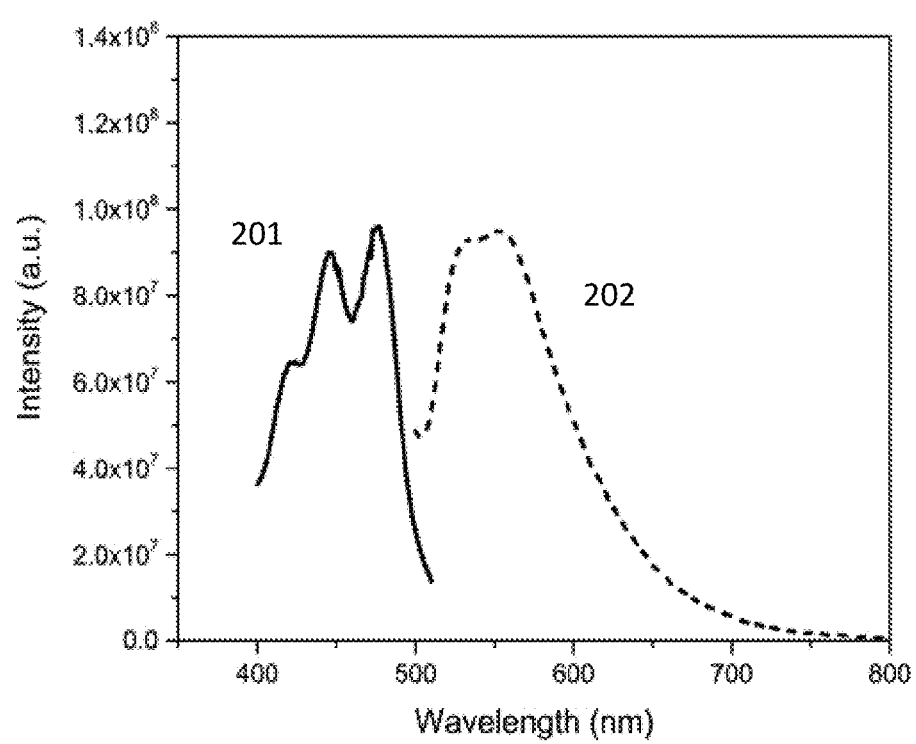
Figure 3:
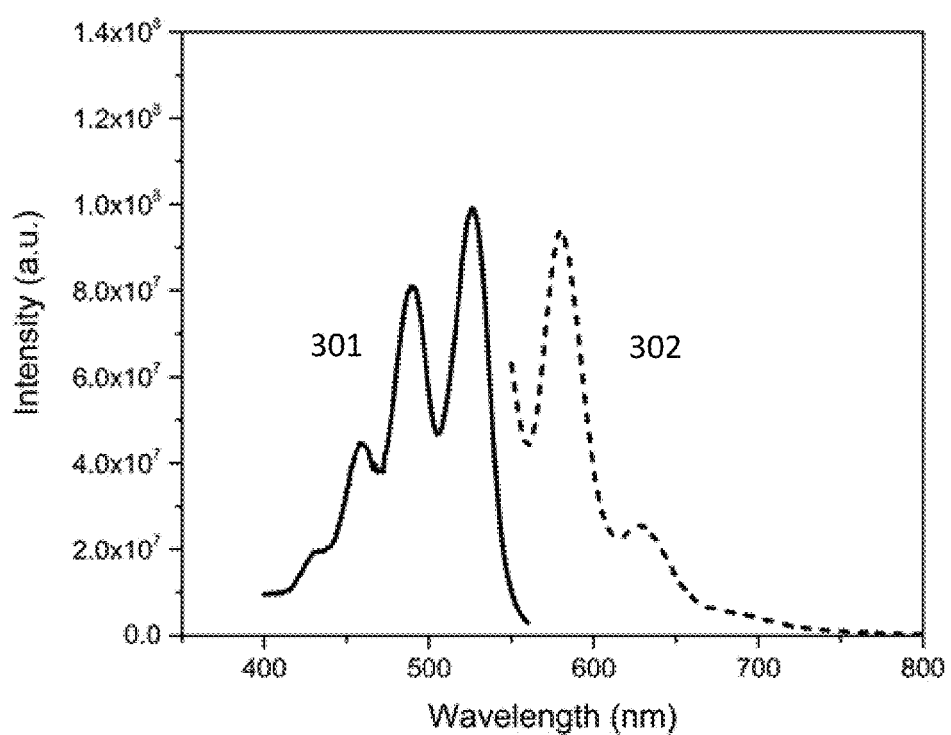

FIGS. 2 and 3 show the emission and excitation spectra for a commercial yellow dye used in INK1 and a commercial orange dye use in INK2 in the following examples.

Figure 4:
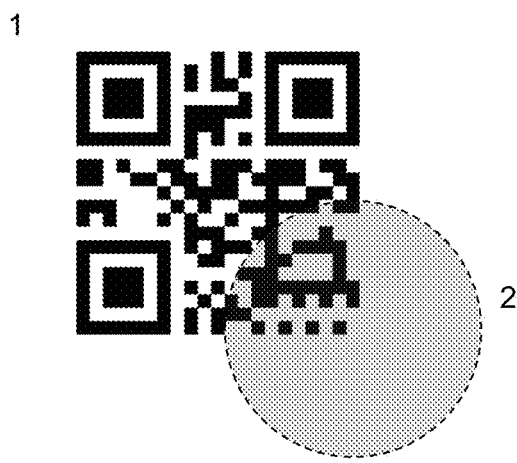

FIG. 4 shows a two-pattern arrangement in accordance with an embodiment of the present invention. PAT1 is referred to as 1 in the figure and made from INK1, and resembles a QR code (QR stands for Quick Response), which is visible under normal daylight by the naked eye. The code can for instance be read by a mobile phone. PAT2 is referred to as 2 in the figure made from INK2 and is in the form of a filled circle in the example. In this embodiment, INK2 is not visible under normal daylight by the naked eye, but can be excited to luminesce in the visible or invisible spectrum range, preferably in the visible spectrum, by the cascade effect.

Figure 5:
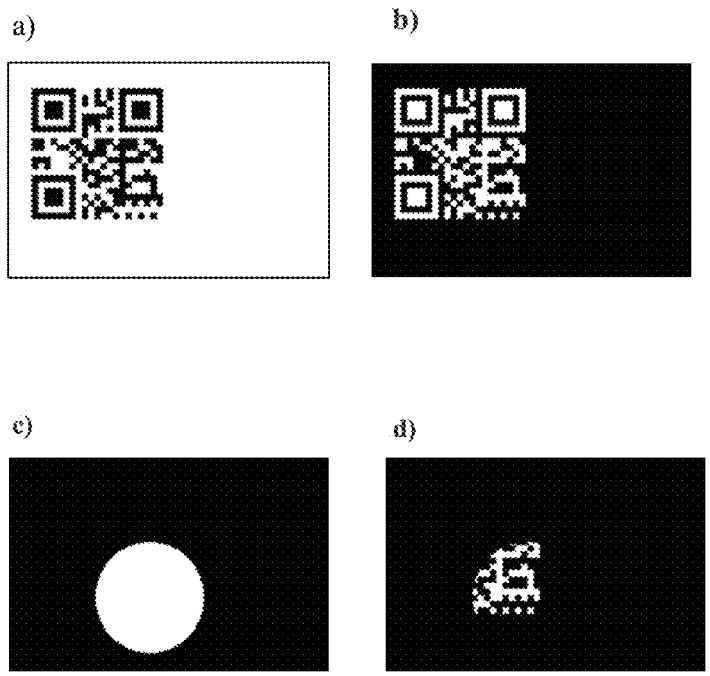

FIG. 5 shows a possible example embodiment of the observed emission of the pattern arrangement shown in FIG. 4 under different illumination and observation conditions.

a) assumes irradiation with a broad-band source of illumination at an intensity of a well lit room or in sunlight over its spectrum. Here, the reflectivity in the visible range is shown, and the QR code as visible under daylight by the naked eye is seen only (PAT1 made from INK1).

In b), luminescence observed in green with blue excitation light is shown. It is shown that with blue illumination, only the QR code is seen when observed in the green wavelength range (corresponding to $\lambda 1e$), which is caused by the fluorescence of INK1 (i.e. in the example $\lambda 1a$ is in the blue wavelength region, $\lambda 1e$ is in the green wavelength region).

In c), the luminescence of INK2 when observed in the red wavelength range is shown upon illumination in the green (i.e. in the example $\lambda 2a$ is in the green wavelength region, and $\lambda 2e$ is in the red wavelength region).

In d) the cascade effect is visible in the overlap of the 2 patterns when observed in the red wavelength range ($\lambda 2e$) upon irradiating in the blue wavelength range ($\lambda 1a$).

Figure 6:
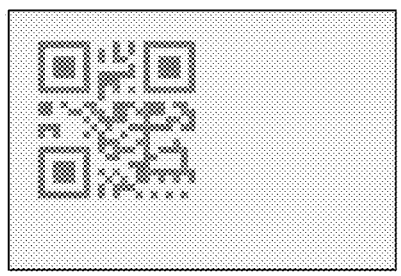
Figure 6:
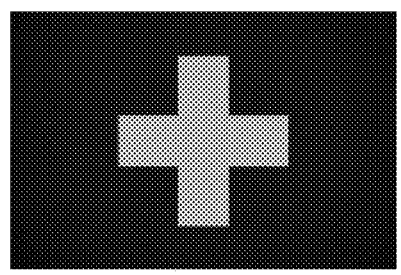
Figure 6:
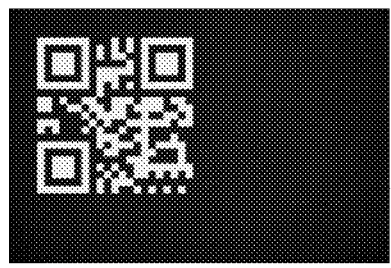
Figure 6:
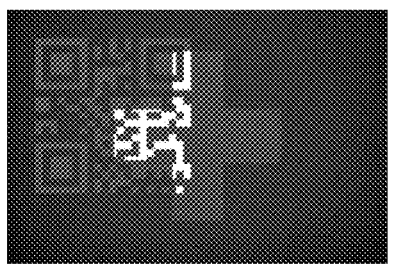

FIG. 6 is another example of a security element, similar to the one shown in FIG. 5. The only difference with FIG. 5 is that the second pattern PAT1 is in the form of a cross instead of a filled circle. Notably, PAT1 extends to an area wherein PAT2 is not provided, so that only a part of the patterns overlap (partial spatial overlap). The illumination and observation wavelength ranges in a-d of FIG. 6 are respectively the same as for a-d of FIG. 5.

Figure 7:
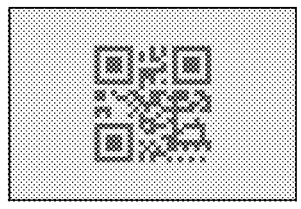
Figure 7:
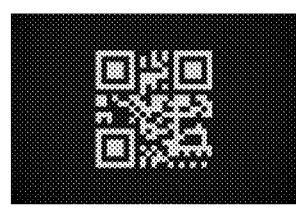
Figure 7:
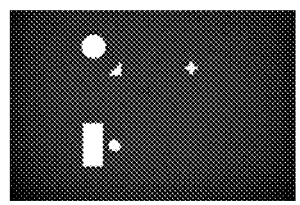
Figure 7:
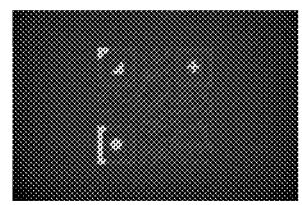

FIG. 7 is another Example of the security element, similar to the one shown in FIG. 5 and FIG. 6. The only difference to FIG. 5 is that the second pattern PAT2 is in the form of a plurality of disjoint elements, e.g. several geometric shapes, like triangles, rectangles, crosses etc. Notably, again the cascade effect is only observed in the areas of overlap. The illumination and observation wavelength ranges in a-d of FIG. 7 are respectively the same as for a-d of FIG. 5.

FIGS. 8a to 8e show specific embodiments of a spectral overlap as schematically illustrated in FIG. 1. Herein, MAT1 and MAT2 are used as synonyms for INK1 and INK2, respectively.

Figure 9:
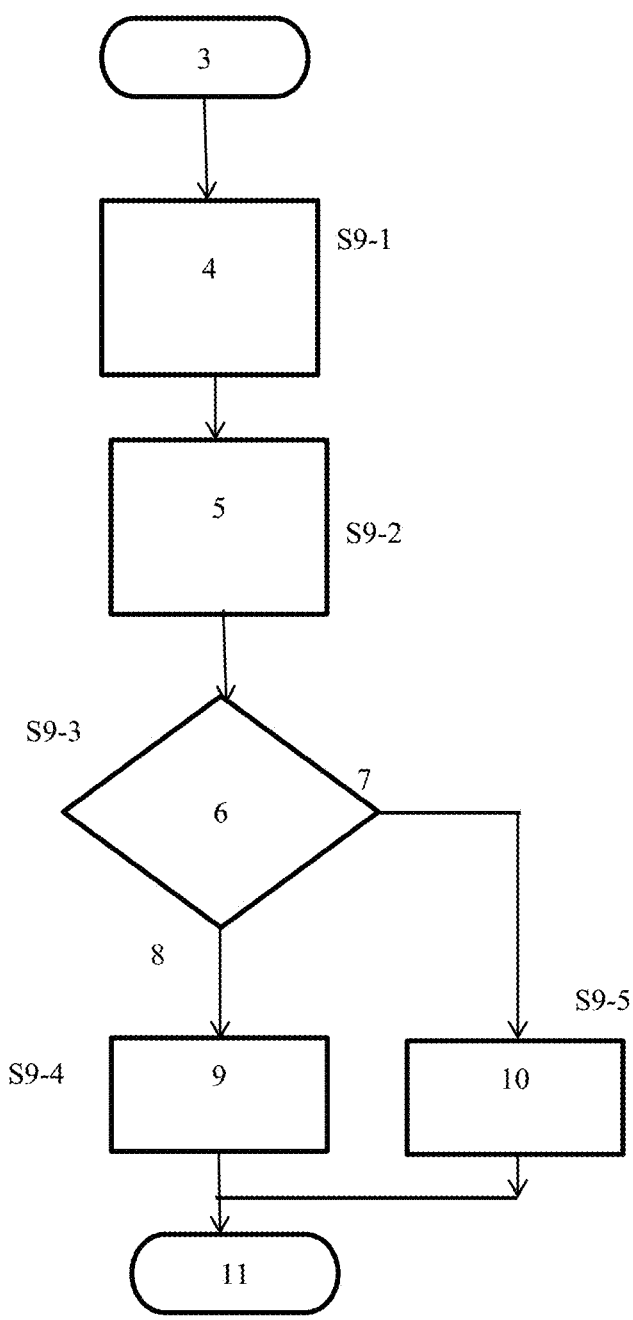

FIG. 9 is a flow chart that shows an embodiment of an authentication method. Here, (3) denotes the start of the method, (4) denotes a step S9-1, wherein a mark is irradiated in a wavelength range $\lambda_1 a$, (5) denotes a step S9-2 wherein the response from the mark is observed, (6) denotes a step S9-3 wherein it is decided if a criterion is fulfilled, (7) denotes the further pathway if said decision is "no", (8) denotes the further pathway if said decision is "yes", (9) shows step S9-4 that follows with the result "authentic", (10) shows step S9-5 that follows with the result "inauthentic", and (11) denotes the end of the method.

Figure 10:
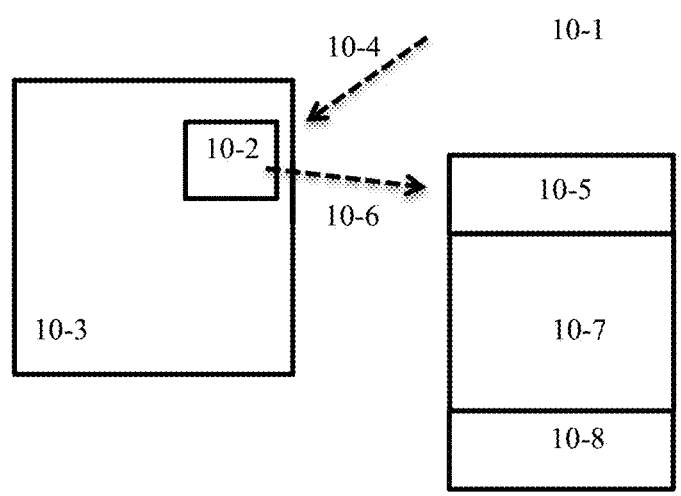

FIG. 10 is a schematic representation of an embodiment of an authentication system.

5. DETAILED DESCRIPTION OF THE INVENTION

The present invention pertains to a security element formed from at least two printing inks INK1 and INK2. INK1 comprises a first luminescent dye or pigment DYE1, and INK2 comprises and a second luminescent dye or pigment DYE2. These two dyes or pigments are selected such that said first luminescent dye or pigment DYE1 (in the following also referred to as "donor"), upon excitation by electromagnetic radiation falling within at least one excitation wavelength range $\lambda 1a$ of the first luminescent dye or pigment, is capable of emitting electromagnetic radiation in a first wavelength range $\lambda 1e$ that overlaps with at least one excitation wavelength range $\lambda 2a$ of the second luminescent dye or pigment DYE2 (also referred to as "acceptor"), to thereby excite the second luminescent dye or pigment DYE2 to emit electromagnetic radiation in a second wavelength range $\lambda 2e$ differing from the first wavelength range $\lambda 1e$.

As set out above, the term "luminescent" is used to jointly denote fluorescent and phosphorescent materials. Hence, DYE1 is a fluorescent or phosphorescent dye or pigment, and DYE2 is also a fluorescent or phosphorescent dye or pigment.

In one preferred embodiment, both DYE1 and DYE2 are fluorescent materials, and herein further preferably DYE1 and DYE2 are both fluorescent dyes. In another embodiment, DYE1 is a phosphorescent material, preferably a phosphorescent pigment, and DYE2 is a fluorescent material, preferably a fluorescent dye. However, also the alternative of DYE1 being a fluorescent material (dye or pigment) and DYE2 being a phosphorescent material (dye or pigment) is conceivable.

In consequence, when the first luminescent dye or pigment present in INK1 is excited by irradiating electromagnetic radiation falling within at least one excitation wavelength range $\lambda_{1a}$ of the first dye or pigment, the first luminescent dye or pigment is able to emit electromagnetic radiation in a first wavelength range $\lambda_{1e}$. The emission of the first luminescent dye or pigment in the wavelength range $\lambda_{1e}$, overlaps with at least one excitation wavelength range $\lambda_{2a}$ of the second luminescent dye or pigment and is utilized to excite the second luminescent dye to emit light in a second wavelength range $\lambda_{2e}$. This principle is referred to as "cascade effect" in the present invention and occurs in area where the patterns formed from INK1 and INK2 overlap. In areas where the patterns do not overlap, a cascade effect does not occur, yet the emission provided by the first or second luminescent dye or pigment can still be observed in their respective emission wavelength ranges and employed for authentication purposes by revealing either pattern 1 or pattern 2 only, provided that sufficient excitation irradiation is provided.

Employing a combination of patterns from at least two inks comprising luminescent dyes or pigments, respectively, wherein the emission of the first luminescent dye or pigment in the first ink INK1 is capable of exciting the second luminescent dye or pigment in INK2 allows obtaining unique excitation/emission properties that can be exploited for authentication purposes. In one aspect, such a combination of inks/patterns allows, in the overlapping areas of the patterns, obtaining the emission of the second luminescent dye or pigment by merely exciting the first luminescent dye or pigment, e.g. by irradiating the ink with electromagnetic radiation in a wavelength region at which excitation of the first luminescent dye or pigment occurs, and it is not necessary to irradiate the ink with radiation capable of exciting the second luminescent dye or pigment in order to obtain the second dye or pigment's emission. If in the area of overlap the proportion of second dye or pigment (acceptor) is significantly larger than that of the first dye or pigment (donor), the spectrum observed upon excitation of the donor will be dominated by the emission of the acceptor, with minor portions stemming from the emission of the donor that is not utilized for excitation of the acceptor. This may be hardly recognizable by the naked eye, and more sophisticated detection equipment may be needed in order to identify the cascade.

Having regard to these features of the invention, it is one decisive advantage of the invention that a counterfeiter may be unable to detect, by analysis of the emission spectra of the security element, that there is an interaction (cascade effect) occurring between the two dyes or pigments present in the respective inks forming the patterns. Rather, a counterfeiter may assume that it will be sufficient to mimic each pattern or ink per se, and will not take into account the necessity of providing for a specific interaction between the dyes.

If the proportion of the donor (i.e. the dye or pigment in INK1) is small, a counterfeiter may mainly (or exclusively) measure the emission from INK2 in the overlap regions (comprising the acceptor), since the emission of the donor mainly excites the acceptor. In the overlap, the emission of the donor may thus not be detectable at all, or may be rather weak, depending on the relative amounts of donor and acceptor in the two inks A counterfeiter's analysis of the ink compositions in the authentication mark is rendered more difficult by the fact that relatively small amounts of donor dye, e.g. 5 to 10% based on the total weight of acceptor and donor in the overlapping areas of the patterns, may in some cases suffice to produce the cascade effect. Furthermore if one or the other pattern is not discernable under normal lightning conditions (invisible), the counterfeiter may even not realize the presence of two distinct patterns.

One further unique feature of the invention is that the authenticating method can determine the (possibly averaged) emission intensity response in the areas of overlap as tailored by the cascade effect (i.e. depending on the choice and ratios of donor and acceptor) as indication of the genuineness of the security element. Indeed, the response, i.e. the observed emission intensity level, will be very sensitive to the precise composition of the two inks, which makes it more difficult to reproduce, leading to an intensity response from the overlap that provides a high reliability of authentication. This intensity level provides an additional degree of security if the authentication method also compares the obtained emission intensity in one or more areas of overlap to an emission intensity obtained from areas of the patterns per se (i.e. outside an overlap area, where only INK1 or INK2 is provided).

The emission spectrum from the spatial overlap region of PAT1 and PAT2, observed over a spectral range that is not necessarily large but identical for all the acquired images of the dual mark according to the invention, does not substantially vary in shape, but varies in intensity level as the ratio of donor and acceptor in INK1 and INK2 is modified. As a consequence, a counterfeiter is forced to reproduce very precisely the composition of the two inks in order to generate an acceptable response to the specific illumination.

It is one particular advantage of the present invention that the intensity response in the spatial overlap region of the patterns PAT1 and PAT2 (also referred to as signature) over a given spectral range not only depends on the energy transfer from the donor to the acceptor (the cascade effect) in the areas of overlap of the patterns, but also on the excitation wavelengths used. Using identical luminescent dyes producing the same cascade effect, but with different excitation wavelengths, will change the observed spectral response (signature). The formulation of inks with the appropriate concentrations of luminescent dyes or pigments, possibly paired with a well-controlled application of the amounts of the inks, in particular in the area in which the patterns overlap, hence can produce distinctive signatures that should only be reproducible at the same excitations and for the same ink compositions at the same or highly similar application amounts. As a counterfeiter generally has no knowledge about the excitation wavelength(s) used for authenticating, it is very difficult for him to mimic the signature obtained by using the two inks INK1 and INK2 employed in the present invention by using a combination of inks that lead to a similar spectral response when excited within a broad wavelength range. Rather, the counterfeiter would need to know which exact excitation conditions (such as a combination of different excitation wavelengths in a certain intensity relationship) are used, and would then need to adapt the spectral response such as to mimic the signature of the security element of the present invention.

Therefore, the excitation spectrum used in the claimed excitation-based authenticating method can be made complex enough to carry a significant and discriminant ink feature, and therefore, one can exploit these properties by imaging the security element with excitation light at different wavelengths. Sequential excitation is preferred in order to exploit linear emission responses. This approach allows both for decoding or geometrical mark inspection and to verify that ink marks vary with the different excitations according to an expected signature (authentication).

Therefore, a problem solved by an embodiment of this invention is that it allows for a more robust authentication of luminescent marks than methods simply based on imaging broader spectral ranges. Embodiments of the invention that use a tailored excitation spectrum technique, can achieve this objective in a simpler and more affordable way than approaches based on spectral emission analysis.

Since the two patterns are applied sequentially to produce the secure mark, it is of great importance to master the application methods of the two inks, namely the printing process. It is a further advantage of the invention that the response of the pattern overlap will strongly depend not only on the excitation wavelength and on the composition of the two inks in terms of dye concentrations but also on the overall formulation of these two inks. In particular, the matrix of the inks (resin and solvent, or UV curable resin) will directly impact the dry material content and hence the final concentration of dyes and pigments, and also the properties at the interface between pattern 1 and pattern 2 in the overlap region. It is at this interface that most of the cascade effect is produced, and the response of the mark in the overlap region will strongly depend on the properties of this interface.

There is therefore an additional challenge for any counterfeiter to mimic the exact interaction in the overlap area, which resides in the requirement to reproduce not only the two ink compositions to obtain the cascade effect with suitable dyes at the specific irradiation wavelength, but also to formulate these inks in such a way that the dry material content and the interface between the two ink layers in the overlap possess the same energy transfer properties.

Note that the printing methods have also a great impact on how the two ink layers will join at the interface in the overlap regions. In a particular embodiment of the invention, two different application methods for the two distinct patterns could be used. It is an additional advantage of the invention that the response will also depend on the ink application method.

Without wishing to be bound by theory, it is believed that the cascade effect occurs to a major degree at or close to the boundary between INK1 and INK2. In order to allow for an efficient energy transfer from the donor in INK1 for exciting the acceptor in INK2, donor and acceptor need to come reasonably close to each other. Accordingly, it is preferred in the present invention that INK1 and INK2 are provided adjacent to each other in z direction. It should be noted that a substrate is assumed to have a predominantly two-dimensional extension, preferably planar, that is describable by coordinates referred to as x,y, and that the third direction (third dimension) perpendicular thereto and connecting the two opposing surfaces of the substrate is referred to in this description as the z direction.

A more prominent effect can thus be achieved if INK1 and INK2 are printed over each other, and wherein the solvent system of one of the inks (preferably the one applied on top of the other, i.e. the one that is applied later) is capable of at least partially dissolving the other ink, respectively the ink layer formed therefrom. In such a case, the ink layers mix at the interface to some extent, thereby allowing the donor and acceptor to come close to each other, thereby improving the efficiency of the cascade effect.

In one embodiment, INK1 is applied first on the substrate, forming the pattern PAT1. That is, a substrate (e.g. paper or cardboard) is provided, INK1 comprising the donor is provided first, and subsequently INK2 comprising the acceptor is provided on top of INK1/PAT1 to form PAT2. In consequence, PAT2 is provided on top (in z direction) of PAT1.

The present invention is however not limited to such an arrangement, as INK2/PAT2 (comprising the acceptor) may also be provided beneath INK1/PAT1 (comprising the donor). However, since in this case the fluorescence emission from DYE2 used for authentication purposes has to cross the layer formed by INK1 in order to exit the security element and to reach a detector, generally preferred is an arrangement wherein PAT1 comprising the donor is formed directly on the substrate, and wherein PAT2 comprising the acceptor is formed directly over or on PAT1 such as to overlap spatially partly or fully therewith. If the alternative arrangement is chosen, i.e. wherein PAT2 is the lower layer and closer to the substrate and wherein PAT1 is provided on top of PAT2, it is preferred that PAT1 is substantially translucent or transparent with a light transmission at $\lambda 2e$ of 60% or more, preferably 80% or more, at the thickness employed for the security element, in dry state.

For PAT2, the material is preferably also translucent or transparent with a light transmission at $\lambda 2e$ of 60% or more, preferably 80% or more, at the thickness employed for the security element, in dry state, in order to avoid quenching of the emission in the material. Further, in particular—but not exclusively—if PAT2 is provided above or on top of PAT1, PAT2 is preferably also translucent or transparent with a light transmission at $\lambda 1a$ of 80% or more, preferably 90% or more, at the thickness employed for the security element, in dry state, in order to allow efficient excitation of DYE1.

Also the printing methods have a significant impact on how the two ink layers will interact at the interface. In a particular embodiment of the invention, two different application methods for the two distinct patterns are used. It is an additional advantage of the invention that the response—and hence the feature used for authentication—will also depend on the ink application methods employed.

With respect to the ink formulation, the combination of
1) the solvent used to print the secondly applied ink (SOLVENT T2) and
2) the type of resin or varnish or any other material which will form the solid dry material from the formulation of the firstly applied ink (RESIN T1)

has a substantial impact on the efficiency of the cascade effect at the ink layers' interface in the overlap region for the following reason. Here, and also in the following, a component denoted with T1 or T2 represents a component of the material applied firstly (T1) or secondly (T2). Yet, material applied firstly (T1) may be either of INK1 and INK2. The material applied secondly (T2) it then the respective other material.

In case that RESIN T1 cannot be dissolved by SOLVENT T2, or in the case where RESIN T1 is densely packed so it does not allow the secondly applied ink to diffuse into the interface with the firstly applied ink, the interface will show an abrupt or sharp transition from INK1 to INK2 respectively the dried layers obtained therefrom, and the energy exchange between the donor and acceptor will not be favorable to the cascade effect because only a few of them will be close to the others.

On the other hand, if SOLVENT T2 can dissolve partially RESIN T1 at the interface, or if RESIN T1 is porous enough to let the secondly applied ink diffuse into the firstly applied ink, an intermediate region will be formed. Here, the luminescent DYE1 in INK1 and the luminescent DYE2 in INK2 will come closer to each other, so that the average distance between the two is reduced for a significantly larger amount thereof. This enhances the efficiency of the cascade effect. Note that it is advantageous that RESIN T1 is freely miscible with RESIN T2, i.e. that no phase separation between the two occurs. This can be achieved by using the same or chemically similar materials as RESIN T1 and RESIN T2.

Therefore, the formulations of INK T1 and INK T2 are preferably such that INK T1 is a solvent based ink providing a relatively porous print and that SOLVENT T2 is able to dissolve RESIN T1 to a certain extent and diffuse within the ink layer formed first. Note that if RESIN T1 and RESIN T2 are similar materials, or even same materials, and SOLVENT T2 can partially dissolve the RESIN T1 at the interface and if both of DYE T1 and DYE T2 of T1 and T2 are luminescent (e.g. fluorescent) dyes, then upon application of T2 over T1, DYE T2 will migrate within the RESIN T1 and come closer to the DYE T1.

There is another factor that influences the proximity of the donor and acceptor dyes or pigments and hence the efficiency of the cascade effect. In particular, in cases where INK1 contains donor pigments, which are typically solid, isolated and non-soluble grains, there is an additional challenge for the ink formulation to provide the acceptor dye or pigment close to the donor pigments. For an efficient energy transfer, not only the concentration of the donor pigments in INK1 within the dry ink layer should be sufficient, but also the position of these (at the surface or uniformly distributed within the layer) is critical and can be controlled by ink formulation. This can be achieved by the skilled person by resorting to common knowledge in the field of ink formulations, and provides an additional lever to tune the efficiency of the cascade effect that can be exploited in the invention, as again a counterfeiter would have to mimic not only the components employed, but also their interaction, as influenced by the arrangement of the components at the interface. These effects are also demonstrated in the Example provided at the end of the specification.

In the following, embodiments of the invention are described:

In one embodiment, a label is printed with a background pattern PAT1 (also referred to as patch or logo) using a first ink (INK1) containing the donor. Optionally, the background print (patch or logo) can be printed with INK1 directly on product packages or on documents, or furthermore on the products themselves, where possible. The patch or logo may also be part of the package, e.g. by using a cardboard or plastic material wherein the phosphorescent pigment is dispersed.

Then, a pattern which can in principle be chosen in any suitable or desirable way and can for instance be a dot matrix code, is printed on top of this patch or logo using a second ink (INK2) to form PAT2, containing the acceptor. In this embodiment, PAT2 is in the form of a code. However, PAT2 may also take the form of other codes, indicia, letters, or other patterns, such as spray patterns. The pattern PAT2 may include item-specific, batch-specific or product-specific information in encoded or non-encoded form, such as a serial number. Typically, INK2 is applied in a coding center or packaging line during personalization of the labels or products, as in a usual process.

In addition, embodiments of the present invention also address the desire for tailoring the ink signature to certain requirements of a user of the inks by using a combination of two specific luminescent dyes in different inks INK1 and INK2. Further advantages of the present invention will become apparent from the following detailed description of the present invention.

These and other advantages of embodiments of the present invention over the prior art can be summarized as follows:

- The cascade effect described above allows for the generation of unique excitation and/or emission spectrum signatures for an enhanced discrimination. The tailoring of the inks allows for quickly changing ink properties, addressing the case of a security element that is copied and that requires a quick action to cure the problem. It is only required to modify one of the two inks to produce a significantly different response in the overlap. Ideally, the authenticating device hardware does not need to be changed, as the change in ink properties can be taken into account by simply updating the authentication criterion, i.e. whether a measured response from a mark under examination shows the behavior expected of an authentic make. This updating of the authentication of the criterion can be achieved by a simple software update in a programmable authentication device.
- The emission spectrum of commercial markers is often publicly available. Therefore, counterfeiters may combine several dyes and/or pigments to mimic a certain signature. However, excitation spectra are less ubiquitous. Therefore, selecting and combining known markers such that a spectrum deemed authentic is obtained for a selected (predetermined) excitation radiation becomes a barrier for a counterfeiter.
- Embodiments of the present invention are compatible with laser illumination (quasi-monochromatic excitation) for more detailed signatures and higher discrimination capability.
- The authentication method of an embodiment of the invention is also suitable for handheld devices (e.g. smartphone based systems), where movable parts or bulky components required for spectral emission analysis represent a drawback.
- In accordance with an embodiment of the invention, it is economically more advantageous and technically simpler to perform excitation analysis (e.g. with multi LED illumination or with multi-laser illumination) with an imaging device than complex emission analysis (Fabry-Perot method; Custom Bayer; AOTF; tunable band pass, etc.).
- Embodiments of the present invention are also easier to implement in authentication systems detecting luminescence, since a modification of the sensors to achieve multispectral emission imaging is not required.
- The method proposed according to an embodiment also allows for the partial authentication of a code (if used in conjunction with it). This means that for a damaged and non-decodable data matrix (or any other 1D or 2D code), partial authentication of the ink with the present invention is still possible provided that some overlap regions remain.
- In addition, the response considered as genuine may rely on relative calculations (e.g. intensity ratios or correlations in different regions of the dual mark—overlap and non-overlap for different excitations). This approach reduces problems caused by differing ink concentration or by ink aging.
- The authentication method of the invention can also be advantageously extended to fine printed designs like logos or images where security ink is printed on small areas hardly accessible with other methods.
- The two printing or application steps for producing the dual mark can take place at different locations (printing facilities) and using different technologies. For example, preprinted labels or packages containing pattern 1 made of INK1 which could consist of a patch or logo could be created on a printing press by heliogravure, offset or screen printing at a given secure printing premise and pattern 2, consisting of a serialization code, printed with INK2 at a different location such as a label serialization center or a manufacturer facility. The cascade effect between the two patterns or marks constitutes a photo-physical link between the label or package and the serialization code. This therefore guarantees the authenticity of both the preprinted label and package and of the subsequently applied serialization code. This represents a protection against counterfeiting in the two following scenarios:
    - Diversion or theft of genuine labels or packages and further fake serialization by printing codes with imitated digital ink
    - Diversion or theft of secure digital ink and printing of serialization codes on imitated labels or fake packages.
- The same advantage of the invention could be obtained by incorporating DYE1 inside the substrate to be further printed with INK2. The substrate could be paper, plastic or any manufactured substrate which allows incorporating dyes or pigments. These dyes or pigment could be distributed uniformly over patches or logos or in the form of particles, flakes or threads.
- In order to obtain the cascade effect at the pattern overlap, additional constraints like the precise ink formulation and the specific application (printing) process and method represent additional barriers for a counterfeiter to imitate the security mark.

In accordance with the invention, the signature (including e.g. the shape of an emission spectrum and/or the intensity of a spectral response at a certain wavelength within λ2e) of a genuine security element at the area of overlap of PAT1 and PAT2 depends on the excitation wavelength(s) used, the ink properties and the application methods. Therefore, for a counterfeiter to forge the security element, he needs to know both the ink's spectral emission properties as a function of the excitation wavelength and the excitation wavelengths used to generate the signature, which further requires reverse-engineering the authentication device. Thus, the same security element can have different signatures according to the excitation wavelengths used. There is therefore an additional challenge for any counterfeiter to mimic the exact interaction in the overlap area of INK1 and INK2, which resides in the requirement to reproduce not only the two ink compositions to obtain the cascade effect with suitable dyes and/or pigments at the specific irradiation wavelength, but also to adapt the formulations in such a way that the dry material content and the interface between the two ink layers in the overlap possess the same energy transfer properties.

The security of the solution can be further enhanced by prescribing the use of several excitation wavelengths for authentication, thus increasing the complexity of the signature to match. Several observation wavelength ranges could also be prescribed, which can reveal different regions of the mark (either pattern 1 or pattern 2 only), in addition to the overlap region.

Finally, the authentication method, which is based on an intensity level produced by a cascade effect detected at the region the overlap of the security mark, represent an advantage over other existing authentication methods that require complex spatial-spectral measurement.

Wavelength Ranges and Absorption Peaks

In the present invention, $\lambda_{1a}$ denotes the excitation wavelength range around an excitation peak at a wavelength $\lambda_{1a\text{-}max}$ of the donor dye or pigment present in INK1, $\lambda_{1e}$ denotes the emission wavelength range around an emission peak at a wavelength $\lambda_{1e\text{-}max}$ of the donor dye or pigment present in INK1;

$\lambda_{2a}$ denotes the excitation wavelength range around an excitation peak at a wavelength $\lambda_{2a\text{-}max}$ of the acceptor dye or pigment present in INK2, and $\lambda_{2e}$ denotes the emission wavelength range around an emission peak at a wavelength $\lambda_{2e\text{-}max}$ of the acceptor dye or pigment present in INK2.

As outlined above and as defined in claim 1, when the first luminescent dye or pigment (donor) in INK1 is excited by irradiating electromagnetic radiation falling within at least one excitation wavelength range $\lambda_{1a}$, it is able to emit electromagnetic radiation in a first wavelength range $\lambda_{1e}$. As shown in FIGS. 1 and 8, the degree of overlap (and the intensity) of the light emitted by the donor must be sufficient to excite the acceptor to emit light. The emission of the first luminescent dye or pigment in the wavelength range $\lambda_{1e}$ overlaps with at least one excitation wavelength range $\lambda_{2a}$ of the second luminescent dye or pigment (acceptor) in INK2 and is utilized to excite the second luminescent dye to emit light in a second wavelength range $\lambda_{2e}$ ("cascade effect"). It is thus required that the emission of the donor overlaps with at least one excitation wavelength range of the acceptor. This is illustrated in FIG. 1.

Herein, the term "wavelength range" in the above ranges $\lambda_{1a}$, $\lambda_{1e}$, $\lambda_{2a}$, and $\lambda_{2e}$ generally denotes the range around an emission peak at a wavelength $\lambda_{max}$ in which excitation or emission, respectively, is observed. More precisely, it defines the area around a peak value $\lambda_{max}$ in a normalized and background-subtracted emission or excitation spectrum, as measured on a transparent substrate such as a plastic (e.g. polyester) film or carrier, including the respective peak and the shoulders thereof up to the points where the line of the normalized and background-subtracted spectrum crosses the baseline (i.e. the reading in the normalized and background-subtracted spectrum where the observed value becomes zero). This range is centered at the respective peak $\lambda_{max}$.

A wavelength range may thus also be regarded as the breadth of the respective peak in an excitation or emission spectrum. As one example, if a given first dye exhibits a peak in an excitation spectrum at 450 nm, and breadth of this peak extends to wavelengths of 440 and 460 nm, respectively, the excitation wavelength range is from 440 to 460 nm.

The cascade effect is illustrated in FIG. 1, where $\lambda_{1a}$ is an excitation range of INK1, $\lambda_{1e}$ is an emission range of INK1, $\lambda_{2a}$ is an excitation range of INK2, $\lambda_{2e}$ is an emission range of INK2, $\lambda_{1a\text{-}max}$ is a peak maximum of excitation of INK1, $\lambda_{1e\text{-}max}$ is a peak maximum of emission of INK1, $\lambda_{2a\text{-}max}$ is a peak maximum of excitation of INK2, and $\lambda_{2e\text{-}max}$ is a peak maximum of emission of INK2. As shown in FIG. 1, the degree of overlap of the light emitted by the donor within the excitation wavelength range of the acceptor (and the intensity) are chosen to be sufficient to excite the acceptor to emit electromagnetic radiation. Therefore, the term "said first emission wavelength range $\lambda1e$ of the first luminescent dye or pigment DYE1 overlaps with the excitation wavelength range $\lambda2a$ of the second luminescent dye or pigment DYE2" denotes that there is an overlap in the respective spectral ranges in the emission wavelength range of the luminescent dye or pigment DYE1 present in INK1 (donor) and the excitation wavelength range of the luminescent dye or pigment DYE2 present in INK2 (acceptor). Taking the example of a luminescent dye DYE 1 (donor) having a first excitation wavelength range $\lambda1e$ of 440 to 460 nm, a spectral overlap is given if an excitation wavelength range of the luminescent dye DYE2 (acceptor) in INK2, i.e. $\lambda2a$, includes the values of 440 nm or 460 nm, respectively.

As one example, an overlap is given if $\lambda1e$ of the donor is from 440 to 460 nm, and $\lambda2a$ of the acceptor is from 450 to 470 nm. A spectral overlap in the sense of the present invention is, however, not given if merely the end values of the ranges are the same, such as in the case of $\lambda1e$=440 to 460 nm and $\lambda2a$=460 to 480 nm.

According to the above definition, a small overlap in the respective ranges $\lambda1e$ and $\lambda2a$ suffices, as also then a cascade effect in the sense of the present invention occurs. The occurrence of the cascade effect is, however, the more pronounced the more there is a degree of overlap between an emission wavelength range $\lambda1e$ of the donor and an excitation wavelength range $\lambda2a$ of the acceptor. In preferred embodiments of the present invention, the "wavelength range" can be taken in a narrower fashion, in order to ensure a stronger degree of overlap between $\lambda1e$ and $\lambda2a$. Accordingly, the term "wavelength range" preferably denotes the span of wavelength values, in a normalized and background-subtracted emission or excitation spectrum, up to and including the wavelengths where the line of the normalized and background-subtracted peak falls to a value of n % (0<x≤100) of the peak value at the wavelength $\lambda$max, e.g. 10%, more preferably 25%, further more preferably 50% of the peak value at the wavelength $\lambda$max. Due to such a narrower "wavelength range", which includes only spectrum values larger than n % (such as 10%, 25% or 50%) of the spectrum amplitude at the maximum, the requirement of an overlap between the (narrower) wavelength ranges leads to a greater overlap between the entire emission spectrum of the donor and the entire excitation spectrum of the acceptor.

Considerations for choice of materials as donor and acceptor to obtain a sufficient "spectral energy transfer" allowing a cascade effect can also be expressed as follows. The spectral energy transfer ratio SE of the cascade effect can be defined as the percentage of area under the normalized (i.e. divided by the maximum spectral amplitude) excitation spectrum of the acceptor $A2(\lambda)$ that also falls under the normalized emission spectrum of the donor $E1(\lambda)$.

According to a preferred example, the excitation spectral range of the acceptor fully falls within the emission spectral range of the donor (CASE1, see FIG. 8a). In other words, 100% of the excitation spectrum of the acceptor is included/comprised inside the emission spectrum of the donor, and the above defined spectral energy transfer ratio is 100%.

Even more preferably, compared to the situation represented in FIG. 8a, the emission spectrum of the donor could exactly match the excitation spectrum of the acceptor so that the whole emission energy of the donor can potentially be transferred to the acceptor. However this situation can rarely be achieved because only a few combinations of materials (pigments and dyes) can satisfy it.

However, other choices of materials are also possible. For example CASE 2 in FIG. 8b where a fraction of, but not the entire, excitation spectrum of the acceptor falls within the emission spectrum of the donor. In this example, the dashed area under A2($\lambda$) that also falls under E1($\lambda$) represents 50% of the total area under A2($\lambda$), such that SE is 50%. Preferably, SE should be larger than 50%, and more preferably larger than 70%.

In CASE 2 according to FIG. 8b, a fraction of the acceptors cannot be excited by the donor because no or little photons are emitted by the donor in a part of the excitation wavelength range of the acceptor. In addition, a fraction of the emission of the donor cannot be used to excite the acceptor because it falls within wavelengths that are outside of the excitation spectrum of the acceptor.

An alternative case (CASE 3 in FIG. 8c) can be envisioned where also 50% of the area under A2($\lambda$) is overlapped by the emission spectrum E1($\lambda$) of the donor, but the whole emission spectrum E1($\lambda$) is enclosed within A2($\lambda$). In this case, all the emitted energy by the donor can potentially be transferred to the acceptor.

Figure 8D:
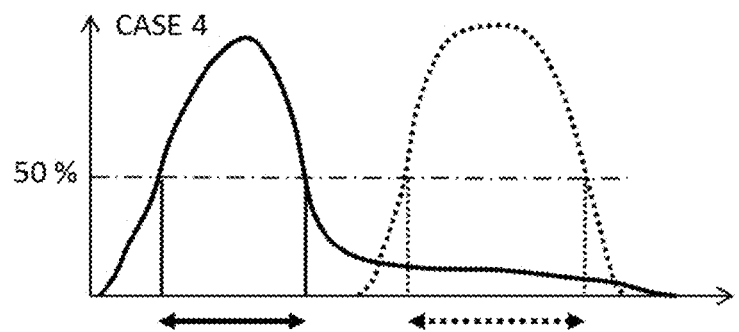

There are, however, other cases possible, such as CASE 4 illustrated as an example in FIG. 8d. Here, although the excitation spectral range of the acceptor is completely overlapped by the donor emission spectrum, the spectral energy transfer ratio would be rather low because the emission spectrum intensity is very low in the region of overlap.

As a consequence, and as described above, the requirement of overlapping spectral ranges can be chosen such that both spectral ranges may only include spectrum values larger than n % of the spectrum amplitude at the maximum (e.g. 50% in FIG. 8d). Then a condition for the spectral energy transfer ratio to be sufficient could be expressed in terms of the ratio of wavelength range where an overlap occurs, to the excitation spectral range (as defined above) of the acceptor. Preferably this ratio is 50% or more, more preferably 70% or more and most preferably, 100%.

The lower the ratio, the poorer is the theoretical energy transfer ratio as described above, which is determined by comparing the respective spectra measured separately for INK1 and INK2, as described below. If the ratio is low, this may be compensated by designing the ink formulation such as to ensure a closer proximity between the donor and the acceptor, as described above, e.g. by using similar materials and solvents in INK1 and INK2. The higher the ratio, th less close have the donor and acceptor to be to ensure a cascade effect.

Figure 8E:
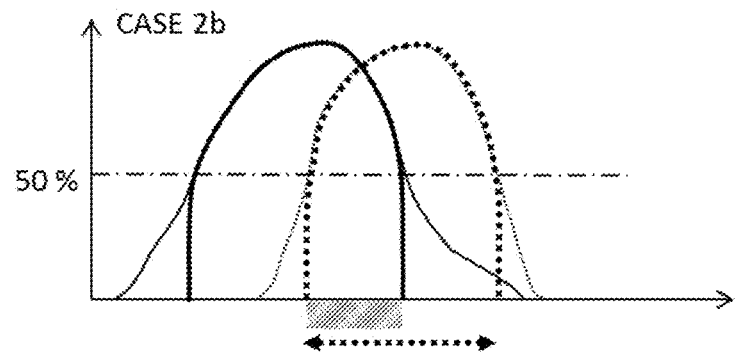

FIG. 8e shows CASE 2b which is an alternative representation of CASE 2 of FIG. 8b (same spectra), but using the criterion defined in terms of wavelength ranges for intensity exceeding 50% of maximum. In this example, the ratio of spectral range overlap to the excitation spectral range of the acceptor is about 50%, which is the same as the criterion using the area of FIG. 8b.

Note that in FIG. 8, MAT1 and MAT2 denote INK1 and INK2, respectively, wherein the excitation and emission spectra are determined as described later.

In the present invention, it assumed that the first luminescent dye or pigment (donor) emits light, which then, due to the overlap between $\lambda_{1e}$, and $\lambda_{2a}$, excites the second dye or pigment to emit light in a another wavelength region. However, without wishing to be bound by theory, the energy transfer from the first dye to the second dye or pigment may also be a radiationless transfer (so-called Foerster resonance energy transfer, FRET). Since it is a requirement for both a radiationless Foerster-type energy transfer and an energy transfer by radiation that there is an overlap between the emission spectrum of the donor and the excitation spectrum of the acceptor, it is without relevance for the present invention whether the energy transfer between the donor and the acceptor is radiationless or includes emission of radiation from the donor and absorption of the radiation (for excitation) by the acceptor, see also D. L. Andrews, A UNIFIED THEORY OF RADIATIVE AND RADIATIONLESS MOLECULAR ENERGY TRANSFER; Chemical Physics 135 (1989) 195-201.

It is preferred that the first luminescent dye or pigment displays an excitation peak in its excitation spectrum at a wavelength ($\lambda_{1a\text{-}max}$) that is shorter than the wavelength $\lambda_{2a\text{-}max}$) at which the second luminescent dye or pigment displays an excitation peak in its excitation spectrum, i.e. that $\lambda_{1a\text{-}max}$ (nm)<$\lambda_{2a\text{-}max}$ (nm).

It is also preferred, in this and other embodiments of the invention, that the first luminescent dye or pigment displays a maximum emission in its emission spectrum at a wavelength ($\lambda_{1e\text{-}max}$) that is shorter than the wavelength ($\lambda_{2e\text{-}max}$) at which the second luminescent dye or pigment displays a maximum emission in its excitation spectrum, i.e. that $\lambda_{1e\text{-}max}$ (nm)<$\lambda_{2e\text{-}max}$ (nm).

It is further preferred that $\lambda_{1a\text{-}max}$<$\lambda_{1e\text{-}max}$<$\lambda_{2a\text{-}max}$<$\lambda_{2e\text{-}max}$, as illustrated in FIG. 1. This is however not mandatory, as an overlap between $\lambda_{1e}$ and $\lambda_{2a}$ can also be realized if $\lambda_{1e\text{-}max}$>$\lambda_{2a\text{-}max}$. Accordingly, in one embodiment of the present invention $\lambda_{1a\text{-}max}$<$\lambda_{2a\text{-}max}$<$\lambda_{1e\text{-}max}$<$\lambda_{2e\text{-}max}$ Typically, the emission peak wavelength of the first and second dye or pigment is located at longer wavelengths than the respective excitation peak wavelength, i.e. $\lambda_{2a\text{-}max}$<$\lambda_{2e\text{-}max}$ and $\lambda_{1a\text{-}max}$<$\lambda_{1a\text{-}max}$<$\lambda_{1e\text{-}max}$. In this case, the emission occurs at longer wavelengths (at lower energy) as compared to the respective excitation. It is however also possible to use, as a first luminescent dye (donor), so-called anti-Stokes luminescent dyes in the present invention, where the emission occurs at shorter wavelengths as compared to the respective excitation, i.e. $\lambda_{1a\text{-}max}$>$\lambda_{1e\text{-}max}$. In such an embodiment, $\lambda_{2a\text{-}max}$ may be at shorter or longer wavelengths as compared to $\lambda_{1e\text{-}max}$.

The difference between the two excitation peaks of the first (donor) and second (acceptor) luminescent dye or pigment, respectively, i.e. ($\lambda_{2a\text{-}max}$)-($\lambda_{1a\text{-}max}$), is for instance at least 5 nm, e.g. 5 to 500 nm, 10 to 200 nm, 20 to 80 nm, 30 to 70 nm, and preferably 50 to 200 nm. A difference of at least 20 nm is preferred in order to avoid excitation of the acceptor dye or pigment by the irradiation of the electromagnetic radiation that is intended to excite donor dye or pigment in an authentication method.

The absolute difference between the emission peak $\lambda_{1e\text{-}max}$ of the donor dye and the excitation peak of the acceptor dye $\lambda_{2a\text{-}max}$, i.e. ABS($\lambda_{2a\text{-}max}$)-($\lambda_{1e\text{-}max}$)) is for instance at most 20 nm. A smaller difference is preferable, since then a greater overlap between $\lambda_{2a}$ and $\lambda_{1e}$ can be ensured.

The wavelength at which a dye or pigment displays a peak in the excitation spectrum ($\lambda_{a\text{-}max}$) or emission spectrum ($\lambda_{e\text{-}max}$) and the respective excitation and emission wavelength ranges are measured as follows.

Notably, in the present invention all measurements are performed at room temperature (20° C.), and consequently the peak wavelengths $\lambda_{1a\text{-}max}$, $\lambda_{1e\text{-}max}$, $\lambda_{2a\text{-}max}$, and $\lambda_{2e\text{-}max}$ as well as the respective ranges $\lambda_{1a}$, $\lambda_{1e}$, $\lambda_{2a}$, and $\lambda_{2e}$ are those measured at room temperature according to the following procedure:

First of all, a blank is prepared, which is ensured to be formulated such as not to interfere with the fluorescence of the donor and acceptor dye or pigment, both chemically and optically. A composition that was found to serve this purpose well is composed of 87 wt.-% Methylethylketone, 10.3 wt.-% of a hydroxyl-containing copolymer made from 84 wt.-% vinyl chloride and 16 wt.-% of acrylic acid ester (commercially available from Wacker Chemie under the tradename VINNOL E15/40 A) and 2% of a terpolymer made from 84 wt.-% vinyl chloride, 15 wt.-% vinyl acetate and 1 wt.-% dicarboxylic acid (commercially available from Wacker Chemie under the tradename VINNOL E15/45 M). While this system is preferably used for the present invention, also other systems can be employed as long as it is ensured that there is no or very little interference with the fluorescence of the donor and acceptor dyes, both chemically and optically.

Then, two separate inks are prepared by dissolving 1.23% of the respective acceptor or donor in the above blank. These are used for determining the wavelength peaks and the wavelength ranges for both emission and excitation, separately for each dye or pigment in each ink.

For the two inks, samples having 12 μm wet film deposit thickness of an ink are then prepared, using e.g. a K Control Coater from RK Print Coat Instruments, e.g. the HC2 coating bar, on a suitable white substrate (e.g. the white part of LENETA N2C-2 substrates), followed by drying at room temperature.

Then, the drawdown samples are measured in emission and excitation mode using a commercial Horiba Fluorolog III (FL-22) as further described below.

Horiba Fluorolog III measurement conditions:

The instrument used to perform emission and excitation spectra measurement is a commercial twice double monochromator equipped with a continuous Xe arc lamp as illumination source and a Hamamatsu R928P photomultiplier tube operated in photon counting mode as detector. The flat sample is positioned so that its normal direction is at an angle of 30 degrees with respect to the irradiation optical axis. The Fluorolog-III type of light collection method used is "Front Face". In this collection mode, the emission collection is performed at an angle of 22.5 degrees with respect to the irradiation beam. By using this collection method and setup, it is ensured that collecting direct specular reflection from the sample is avoided. Both excitation and emission monochromators are double monochromators fitted with 1200 grid/mm holographic gratings blazed at 500 nm.

For excitation spectrum measurement, as shown for instance in the curves 201 and 301 on the left of both plots of FIGS. 2 and 3 respectively, the following procedure is adopted: the emission monochromator is set at a given wavelength (the one where the emission is to be measured, for example 530 nm on FIG. 2) and the excitation monochromator is scanned at 1 nm increment, over the wavelength range where the excitation spectrum is to be measured (e.g. 400 to 510 nm). At each excitation wavelength increment, a measurement of the emission signal is recorded by the detector using a 100 ms integration time. As known to the skilled person, since the irradiation source is not spectrally flat, a suitable irradiation correction is applied onto the measured signal at every wavelength using an appropriate spectral calibration. A spectral correction of the detector sensitivity is also applied. The spectrally corrected excitation spectrum can hence be reconstructed.

For emission spectrum measurement, the excitation monochromator is set to the desired excitation wavelength (e.g. at 480 nm for the left curve of the left plot of FIG. 2) and the emission monochromator is scanned over the desired emission spectral range (500 to 800 nm for the right curve of the left graph of FIG. 2 for example) at 1 nm increment while recording the detector signal at each wavelength with a 100 ms integration time. The emission spectrum is then constructed from all recorded data points and after having applied the suitable spectral sensitivity corrections of the instrument.

The spectral calibration of the Fluorolog III excitation channel is made using a procedure that is commonly applied by persons skilled in the art: the spectral irradiance is measured using a calibrated detector (e.g. a reference photodiode) positioned at the location of the sample. This is made for all wavelengths by scanning the excitation monochromators. This reference detector has a known spectral response (sensitivity as a function of the wavelength of radiation impinging on it) that has been previously determined by measuring an irradiation standard (e. g. a calibrated tungsten ribbon lamp) in a laboratory. An excitation spectral calibration curve is then calculated by dividing the real spectral sensitivity of the used reference detector by the measured spectral irradiance. This calibration curve can then be used to correct the spectral response to excitation of any further measurement by simple multiplication.

A spectral sensitivity calibration of the emission measurement channel of the Fluorolog III is performed in an analogue way by using a spectral irradiance standard (e.g. a tungsten ribbon lamp, which spectral irradiance has been determined in a laboratory). This lamp is disposed at the location of the sample and spectral emission is recorded by the Fluorolog III detector during scanning the emission monochromators. An emission spectral sensitivity curve is obtained by dividing the spectral irradiance curve of the standard irradiance source by the measured spectral curve. Further measurements are then corrected by multiplication by the spectral emission calibration curve.

These calibration procedures are repeated regularly to ensure correction of any instrument drift or detector/Xe lamp ageing.

The overall spectral resolution of the instrument for both emission and excitation measurements is 0.54 nm FWHM (Full Width at Half Maximum), for the slits configuration used in the measurement conditions described above.

The same above procedure is followed for all different sample measurements; only the spectral ranges for the excitation and emission spectrum measurements, along with the excitation and emission fixed wavelengths may differ depending on the dye in the samples.

As derivable from the above, since the measurements shall serve to evaluate the spectral properties in the final ink print, the donor or acceptor dye is dissolved in a blank composition at a concentration of 1.23 wt.-%. Then, emission and excitation spectra are recorded, separately for each dye and ink, and under the same conditions as for the blank. For each dye and ink, the background is subtracted and the spectrum normalized (with the highest peak having an intensity of 1.0), and the peak wavelength(s) $\lambda_{max}$ and the emission and excitation wavelength ranges $\lambda_{1a}$, $\lambda_{1e}$, $\lambda_{2a}$ and $\lambda_{2e}$ are determined by determining the points where the spectrum returns to baseline (or to 10, 25 or 50% above baseline, depending on the definition of the term "wavelength range" as discussed above).

These measurements thus provide the wavelength ranges $\lambda_{1a}$, $\lambda_{1e}$, $\lambda_{2a}$ and $\lambda_{2e}$ and the respective wavelengths of the peaks $\lambda_{1a\text{-}max}$, $\lambda_{1e\text{-}max}$, $\lambda_{2a\text{-}max}$ and $\lambda_{2e\text{-}max}$. These values are then used to determine whether or not the cascade effect requirements of the present invention are satisfied, i.e. whether the requirement of an overlap between the ranges $\lambda_{1e}$ and $\lambda_{2a}$ is satisfied. These measurements can also be used to identify suitable dyes and pigments as acceptor and donor for the purposes of the present invention.

In the above explanations, it was assumed that each luminescent dye or pigment exhibits only one excitation peak ($\lambda_{1a\text{-}max}$, $\lambda_{2a\text{-}max}$) and one emission peak ($\lambda_{1e\text{-}max}$, $\lambda_{2e\text{-}max}$), and only one corresponding excitation wavelength range ($\lambda_{1a}$, $\lambda_{2a}$) and one emission wavelength range ($\lambda_{1e}$, $\lambda_{2e}$). While this is true for many dyes and pigments, a considerable number of dyes and pigment show multiple excitation peaks and multiple emission peaks (see FIG. 2 or 3). In such cases, each peak in the normalized spectrum reaching an intensity of 0.5 or more (preferably 0.75 or more) may serve as emission peak ($\lambda_{1e}$, $\lambda_{2e}$) or absorption peak ($\lambda_{1a}$, $\lambda_{2a}$) for the purposes of the present invention, so that there may be multiple $\lambda_{1e}$ and $\lambda_{1a}$, or multiple $\lambda_{2e}$ and $\lambda_{2a}$.

The explanations above then apply to each of the peaks and wavelength ranges. For instance, it is sufficient that there is an overlap between any $\lambda_{1e}$ and any $\lambda_{2a}$, so that energy is transferred from the donor to the acceptor.

When an excitation or emission spectrum of a dye or pigment used in the present invention shows several overlapping peaks, the peaks and wavelength ranges are obtained by fitting the obtained spectrum using a suitable software (least square method), such as for instance OCTAVE. Herein, a spectrum of overlapping peaks can be satisfactorily (Goodness of Fit<0.1) simulated by assuming an overlap of two (or rarely three) peaks, and the simulated values are taken for the identification of the peak wavelengths and for the identification of the wavelength ranges.

Dyes and Pigments

Generally speaking, both the first and second dye/pigment preferably show excitation bands and emission bands in the range of 40 to 2400 nm, in particular 300 to 1100 nm. Preferably, the donor shows emission bands, in particular the maximum emission, and the acceptor shows excitation bands, and in particular maximum excitation, in the UV range or visible range (in particular 300 to 700 nm), and the acceptor shows emission bands (to be excited by the donor), in particular the maximum emission, in the visible or IR range (in particular 400 to 1100 nm). "Visible range" means from 400 to 700 nm, "UV range" from 40 to less than 400 nm and "IR range" from more than 700 nm to 2400 nm. More specifically, the donor dye preferably shows emission band(s) matching acceptor dye excitation band(s) in the range 250-900 nm Luminescent dyes and pigments adequate for preparing the printing ink of the invention and for implementing the authentication method, can be suitably selected from commercially available dyes and pigments. They can for instance be selected from the following substance classes:

Cyanines (polymethines) and the related cyanine-type chromophors, quinones and the related quinone-type chromophors, porphines, phtalocyanines and the related macrocyclic chromophors as well as polycyclic aromatic chromophors.

Cyanine (polymethine) dyes are known in the art and used as photographic sensitizers (D. M. Sturmer, The Chemistry of Heterocyclic Compounds, Vol 30, John Wiley, New York, 1977, pp. 441-587; Eastman Kodak). In a more recent application, stable representatives of this compound class, selected from the coumarins and rhodamines, were also used as laser dyes (J. B. Marling, J. H. Hawley, E. M. Liston, W. B. Grant, Applied Optics, 13(10), 2317(1974)). Known fluorescent Rhodamine dyes include e.g. Rhodamine 123, Rhodamine 6G, Sulforhodamine 101, or Sulforhodamine B.

Phthalocyanines and related dyes are the "industrial variant" of porphines and include a greater number of well-known fluorescent dyes. They generally absorb at the long wavelength end of the visible spectrum. The class of phtalocyanines at large comprises as well the higher-conjugated analogs, such as the naphthalocyanines, which absorb farther in the IR, as well as the heterosubstituted analogs of phtalocyanines; the common point defining this compound class is that all of its members are derived from aromatic ortho-dicarboxylic acids or from their derivatives.

Quinone dyes are known in the art and used for textile and related dying applications (e.g. indigoid dyes, anthraquinone dyes, etc.). Electronegative groups or atoms along the quinone skeleton can be present to enhance the intensity of the absorption band, or to shift it to longer wavelengths.

Fluorescent aromatic polycyclic dyes include a rigid, planar molecular structure (similar to the graphite lattice) which may carry substituents. Typically the planar molecular structure comprises at least two fused aromatic benzene rings (e.g. 2 to 6 rings). In one of the fused aromatic rings, e.g. the central ring of three fused six-membered aromatic rings, one or two carbon atoms may be replaced by C=O, O and/or N. Fluorescent members of this class of dyes and pigments can be selected e.g. from perylenes (e.g. Lumogen F Yellow 083, Lumogen F Orange 240, Lumogen F Red 300, all available from BASF AG, Germany), naphtalimides (e.g. Lumogen F Violet 570, available from BASF AG, Germany) quinacridones, acridines (e.g. Acridine orange, Acridine yellow), oxazines, dioxazines, or fluorones (e.g. Indian Yellow) are examples of such dyes. Further examples include fluorene copolymers, also called luminescent conjugated polymers. Examples of such materials are referenced in US2003/0154647 A1 (U.S. Pat. No. 6,808,542).

Similarly to the dye, the pigment is not particularly limited as long as it has the required spectral properties and is capable of showing fluorescent emission in a wavelength $\lambda_{2e}$ upon excitation in a wavelength range $\lambda_{2a}$. Useful pigments include virtually all fluorescent pigments known to the skilled person. Such pigments are well-known to the skilled person, and many such pigments are commercially available. They can generally be identified in the following classes of compounds 1) Semiconductors of III-V type, such as GaAs, GaP, GaAsP, GaSb, InAs, InP, InSb, AlAs, AlP and AlSbor II-VI type, such as CdS, CdSe, CdTe, HgS, ZnS, which are doped with a species selected from groups 1 (Li, Na, K, Rb, Cs), 2 (Be, Mg, Ca, Sr), Al, Cr, Tl, Mn, Ag, Cu, As, Nb, Ni, Ti, In, Sb, Ga, Si, Pb, Bi, Zn, Co and/or group group 3 (e.g. Sc, Y, La), or lanthanides (elements 58 to 71, i.e. Ce, Pr, Nd, Pm, Sm, Eu, Gd, Tb, Dy, Ho, Er, Tm, Yb and Lu).

2) Fluorescent, doped metal oxides, such as those described in U.S. Pat. No. 6,309,701, including host metal oxide such as $Y_2O_3$, $ZrO_2$, ZnO, CuO, $CuO_2$, $Gd_2O_3$, $Pr_2O_3$, $La_2O_3$, and mixed oxides, being doped with at least one rare earth metal (hereinafter to be understood as Sc, Y, La and the elements 58 to 71), in particular Eu, Ce, Nd, Sm, Tb, Gd, Ho, and/or Tm;

3) Optionally doped metal salts of wherein the anion is preferably selected from phosphates, halophosphates, arsenates, sulphates, borates, aluminates, gallates, silicates, germanates, vanadates, niobates, tantalates, wolframates, molybdates, alkalihalogenates, other halides (in particular fluorides and iodides), nitrides, sulphides, selenides, sulphoselenides, as well as oxysulphides. The metals preferably belong to the main groups 1, 2, 13, or 14, the subgroups 3, 4, 5, 6, 7, or the lanthanides. The dopant metal is preferably selected from groups 1 (Li, Na, K, Rb, Cs), 2 (Be, Mg, Ca, Sr), Al, Cr, Tl, Mn, Ag, Cu, As, Nb, Ni, Ti, In, Sb, Ga, Si, Pb, Bi, Zn, Co and/or group group 3 (e.g. Sc, Y, La), or lanthanides (elements 58 to 71, i.e. Ce, Pr, Nd, Pm, Sm, Eu, Gd, Tb, Dy, Ho, Er, Tm, Yb and Lu). One example is for instance CsI with a fluorescent emission around 315 nm. The optional dopant is preferably Eu, Ce, Nd, Sm, Tb, Gd, Ho, Tm, a combination of Ce and Tb or Ce and Dy.

In the following, some examples for luminescent pigments are given which can be used in the present invention:

$Bi_4Ge_3O_{12}$ LiI:Eu; NaI:Tl; CsI:Tl; CsI:Na; LiF:Mg; LiF:Mg,Ti, LiF:Mg,Na; $KMgF_3$:Mn; $Al_2O_3$:Eu; $BaFCl$:Eu; BaFCl:Sm; BaFBr:Eu; $BaFCl_{0.5}Br_{0.5}$:Sm; $BaY_2F_8$:A (A=Pr, Tm, Er, Ce); $BaSi_2O_5$:Pb; $BaMg_2Al_{16}O_{27}$:Eu; $BaMgAl_{14}O_{23}$:Eu; $BaMgAl_{10}O_{17}$:Eu; (Ba, Mg)$Al_2O_4$:Eu; $Ba_2P_2O_7$:Ti; (Ba, Zn, Mg)$_3Si_2O_7$:Pb; Ce(Mg, Ba)$Al_{11}O_{19}$; $Ce_{0.65}Tb_{0.35}MgAl_{11}O_{19}$; $MgAl_{11}O_{19}$:Ce,Tb; $MgF_2$:Mn; MgS:Eu; MgS:Ce; MgS:Sm; MgS(Sm, Ce); (Mg, Ca)S:Eu; $MgSiO_3$:Mn; $_{3.5}MgO_{.0.5}MgF_2GeO_2$:Mn; $MgWO_4$:Sm; $MgWO_4$:Pb; $6MgO \cdot As_2O_5$:Mn; (Zn, Mg)$F_2$:Mn; (Zn, Be)$SO_4$:Mn; $Zn_2SiO_4$:Mn; $Zn_2SiO_4$:Mn,As; ZnO:Zn; ZnO: Zn,Si,Ga; $Zn_3(PO_4)_2$:Mn; ZnS:A (A=Ag, Al, Cu); (Zn, Cd)S:A (A=Cu, Al, Ag, Ni); $CdBO_4$:Mn; $CaF_2$:Dy; CaS:A (A=lanthanides, Bi); (Ca, Sr)S:Bi; $CaWO_4$:Pb; $CaWO_4$:Sm; $CaSO_4$:A (A=Mn, lanthanides); $3Ca_3(PO_4)_2 \cdot Ca(F, Cl)_2$:Sb, Mn; $CaSiO_3$:Mn, Pb; $Ca_2Al_2Si_2O_7$:Ce; (Ca, Mg)$SiO_3$:Ce; (Ca, Mg)$SiO_3$:Ti; $2SrO_{0.6}(B_2O_3) \cdot SrF_2$:Eu; $3Sr_3(PO_4)_2 \cdot CaCl_2$:Eu; $A_3(PO_4)_2 \cdot ACl_2$:Eu (A=Sr, Ca, Ba); (Sr, Mg)$_2P_2O_7$:Eu; (Sr, Mg)$_3(PO_4)_2$:Sn; SrS:Ce; SrS:Sm,Ce; SrS:Sm; SrS:Eu; SrS:Eu,Sm; SrS:Cu,Ag; $Sr_2P_2O_7$:Sn; $Sr_2P_2O_7$:Eu; $Sr_4Al_{14}O_{25}$:Eu; $SrGa_2S_4$:A (A=lanthanides, Pb); $SrGa_2S_4$:Pb; $Sr_3Gd_2Si_6O_{18}$:Pb,Mn; $YF_3$:Yb,Er; $YF_3$:Ln (Ln=lanthanides); $YLiF_4$:Ln (Ln=lanthanides); $Y_3Al_5O_{12}$:Ln (Ln=lanthanides); $YAl_3(BO_4)_3$:Nd,Yb; (Y,Ga)$BO_3$:Eu; (Y,Gd)$BO_3$:Eu; $Y_2Al_3Ga_2O_{12}$:Tb; $Y_2SiO_5$:Ln (Ln=lanthanides); $Y_2O_3$:Ln (Ln=lanthanides); $Y_2O_{2S}$:Ln (Ln=lanthanides); $YVO_4$:A (A=lanthanides, In); $Y(P,V)O_4$:Eu; $YTaO_4$:Nb; $YAlO_3$:A (A=Pr, Tm, Er, Ce); YOCl:Yb,Er; $LnPO_4$:Ce,Tb (Ln=lanthanides or mixtures of lanthanides); $LuVO_4$:Eu; $GdVO_4$:Eu; $Gd_2O_2S$:Tb; $GdMgB_5O_{10}$:Ce,Tb; LaOBr:Tb; $La_2O_2S$:Tb; $LaF_3$:Nd,Ce; $BaYb_2F_8$:Eu; $NaYF_4$:Yb,Er; $NaGdF_4$:Yb,Er; $NaLaF_4$:Yb,Er; $LaF_3$:Yb,Er,Tm; $BaYF_5$:Yb,Er; $Ga_2O_3$:Dy; GaN:A (A=Pr, Eu, Er, Tm); $Bi_4Ge_3O_{12}$; $LiNbO_3$:Nd,Yb; $LiNbO_3$:Er; $LiCaAlF_6$:Ce; $LiSrAlF_6$:Ce; $LiLuF_4$:A (A=Pr, Tm, Er, Ce); $Gd_3Ga_5O_{12}$:Tb; $Gd_3Ga_5O_{12}$:Eu; $Li_2B_4O_7$:Mn,SiOx:Er,Al (0<x<2).

A suitable donor-acceptor pair can be properly selected from these and other known luminescent dyes and pigments based on their spectral properties, which, as a rule, are published by the manufacturer and can be easily measured, as explained above. It however needs to be considered that the excitation behavior of the dried printed ink composition is decisive for obtaining the effect of the invention, so that published data generally should be verified by measuring the absorption and emission spectrum in accordance with the method described above for a printed ink on the final substrate. This is due to the fact that published data may relate to solutions of the dyes in a particular solvent (e.g. $CH_2Cl_2$) wherein the spectral properties may be different from the printed ink, e.g. due to interactions with the substrate. Although generally to a lesser extent, the spectral properties of pigments may also be influenced by the surroundings, so that the same applies.

Even if only the excitation and emission maxima are available (before complete absorption and emission spectra have been measured) an evaluation will be possible to what extent the emission spectrum of the donor is likely to overlap with the excitation spectrum of the acceptor thereby allowing a screening of suitable candidates.

Printing Ink Composition

Each of the printing inks INK1 and INK2 used for preparing the security element of the present invention comprises at least one luminescent dye or pigment acting as a donor or as acceptor, respectively, as explained above. However, the inks are typically not simply a solution or dispersion of one of these two dyes or pigments in a solvent, but contain further components that render them suitable for use as printing inks. Such components typically include at least a solvent and a binder.

There are general requirements regarding the ink formulations, which are related to the absorption (respectively the transparency) of the two formulated inks. This depends mainly on the sequence of successive application (printing) of PAT1 with INK1 (donor) and PAT2 using INK2 (acceptor).

In a first embodiment, PAT1 is printed first and PAT2 is printed on top with partial overlap. In this case, it has to be ensured that PAT2 printed with INK2 does not, or at least does not completely, absorb the wavelength of excitation of DYE1 in INK1 ($\lambda_{1a}$) so that INK1 can be properly excited by the irradiation traversing the INK2 layer, in regions of overlap, in order for the cascade effect to occur. Accordingly, the dried ink layer obtained from INK2 preferably does not absorb more than 50%, more preferably not more than 30%, and more preferably not more than 20% at $\lambda_{1a\text{-}max}$, at the application amount/dried ink layer thickness employed for the manufacture of the security element of the present invention.

In another embodiment, PAT2 with INK2 (acceptor) could be printed first and PAT1 with INK1 (donor) second. In this case the formulation of INK1 should be made such that when dry, it does not, or at least not completely, absorb in the emission wavelength range of DYE2 in INK2 ($\lambda_{2e}$), so that the emission of INK2 traversing the INK1 layer can be detected. In this embodiment, the dried ink layer obtained from INK1 preferably does not absorb more than 50%, more preferably not more than 30%, and even more preferably not more than 20% at $\lambda_{2e\text{-}max}$, at the application amount/dried ink layer thickness employed for the manufacture of the security element of the present invention.

The printing inks used in the invention can be formulated in a manner known in the art depending on the printing method to be used, for instance as intaglio-printing ink, dry offset ink, e.g. dry offset UV drying ink, gravure ink or the like. They may also be provided as a set of printing inks. The printing inks used in the invention comprise a solvent (organic or aqueous) in which donor or acceptor can be dissolved, a binder, and optionally other, in particular, non-luminescent dyes or pigments. Of course, further additives may optionally be present.

The solvent can be selected from solvents commonly used in the art of ink formulation such as aliphatic or aromatic alcohols (e.g. ethanol, isopropanol or benzyl alcohol), esters, (e.g. ethyl acetate, butyl acetate), ketones (e.g. acetone, methyl ethyl ketone), carboxamides (e.g. diamethylformamide) or hydrocarbons including aliphatic and aromatic hydrocarbons such as xylene or toluene and glycols.

The binder can also be selected from binders commonly used in the art of ink such as polymeric binders of the resin type, e.g. alkyd resin, polyamide, acrylic, vinyl, polystyrene, or silicone.

The ingredients of the printing inks and the concentrations of donor or acceptor are preferably selected such that their concentrations still stay below their solubility limits in the blank during the drying process.

In one embodiment, the printing inks used in the invention may also comprise other, in particular non-luminescent dyes or pigments. These other dyes or pigments may be selected such that they mask the presence of donor and acceptor dye/pigment, thereby rendering their presence a covered secured feature. This masking is preferably effected by using other dyes that do not strongly absorb in the emission wavelength range of donor and/or acceptor $\lambda_{1e}$, $\lambda_{2e}$.

However, in order to avoid any interference with the cascade effect of the present invention, the printing inks INK1 and INK2 preferably do not contain any further colouring additives, such as additional dyes and pigments. In this case, nonetheless the presence of one or both of the printing inks may be masked by printing the security element of the present invention on a region of a substrate that is strongly colored, e.g. in black.

Depending on the type of printing ink to be formulated, the same may also include one or more of the following optional additives: oils, diluents, plasticizers, waxes, fillers, dryers, antioxidants, surfactants, defoaming agents, catalysts, UV-stabilizers, polymerizable compounds and photoinitiators.

When selecting suitable components for the printing ink, the skilled person will consider that their properties, in particular their potential capacity to absorb and/or emit light, does not adversely affect the energy transfer (cascade effect) from the donor to the acceptor, also taking into account the 2 different printing sequences mentioned above (PAT1 printed first and then PAT2, or PAT2 printed first and then PAT1).

In the printing inks used in the invention, the total mass ratio of each luminescent dye or pigment. based on the total dry content of the respective ink INK1 or INK2, respectively, is preferably 0.05 wt.-% to 20 wt.-%. Put differently, the dry content of the donor in INK1 is preferably 0.05-20 wt.-%, and the dry content of the acceptor in INK2 is also preferably 0.05-20 wt. %.

The present invention also relates to the use of the security element of the invention for authenticating an article, and articles carrying an authenticating mark comprising the security element of the invention. The term "article" is to be understood in a broad sense and includes, but is not limited to, banknotes, value papers, identity documents, cards, tickets, labels, security foils, security threads, products and product packages.

Ink Patterns and Overlapping Areas Thereof

The term "pattern" denotes any arrangement of a printed ink on a substrate that is not a full-solid coverage of the substrate. A pattern may be regular or irregular in shape. A pattern may be formed of one continuous area having a certain shape (such as in the letters "A", "B", or "X") or may be formed of more than one continuous area having the same or different shapes that together form a pattern (such as in "AA", "BB", "AX" or "BA"). While a pattern may take the shape of a letter, symbol or logo, it may also be irregular and/or fully random. One example of such an irregular pattern is a spray spatter that is obtained by spraying INK1 or INK2 on a substrate.

The security element of the present invention comprises at least two patterns PAT1 and PAT2 made from INK1 and INK2, respectively. In each of the patterns PAT1 and PAT2, the luminescence of the luminescent dye or pigment contained therein can be observed upon a suitable excitation and detection scheme.

It is a requirement of the present invention that the two or more patterns PAT1 and PAT2 overlap partially. In this case, the cascade effect described above can be observed in the area of overlap.

One example is for instance the letter X, wherein the line from bottom left to top right forms a first pattern made from INK1 or INK2, and the line from bottom right to top left is made from the respective other ink. The two patterns overlap in the central region of the letter where the cascade effect can be observed. Here, the patterns overlap in only one area.

Another example is a logo formed from different overlapping patterns, such as the Olympic Rings. Herein, each of the rings can be considered a pattern in the sense of the present invention. When two rings crossing each other are made from INK 1 and INK2, respectively, the cascade effect can be observed in the areas of overlap. Herein, the patterns overlap in several areas (two for each pair of crossing rings).

Yet, all the rings together may form a pattern in the sense of the present invention, and are made from either INK1 or INK2. If one or more the rings overlap with another pattern (e.g. a word or sentence) printed over or beneath the rings, again areas of overlap will be present in which the cascade effect can be observed.

In one embodiment, one of the patterns is a random pattern, such as obtained by spraying an ink. If an ink is sprayed on a substrate already carrying a pattern formed from INK1 or INK2, it is highly likely that some of the stains obtained from the spraying process will overlap with some parts of the pattern that has previously been formed. This will then randomly form areas of spatial overlap of PAT1 and PAT2.

In one preferred embodiment of the present invention, one of the inks INK1 and INK2 does not provide a noticeable contrast against the background, as observed with the naked eye under normal daylight. This "invisible" luminescent ink pattern formed therefrom can then be used as a covert low-level security feature for inspection e.g. at supermarket checkouts, by illuminating the "invisible" pattern with light capable of exciting fluorescence by the dye or pigment in the visible ink.

This illuminating radiation may or may not fall within the excitation wavelength range in which the cascade effect can be induced:

If the illuminating light does not fall within the range in which the cascade effect can be induced (i.e. $\lambda 1a$), but which is capable of exciting the dye or pigment (e.g. in the range $\lambda 2a$) nonetheless a luminescent low-level security feature is present. The cascade effect can then be used as a higher level security feature for check e.g. by banks, by using (unpublished) radiation ($\lambda 1a$) in which the cascade effect can be induced and which may be light of wavelengths that are not typically used for the verification of luminescent features.

If the illuminating light falls within the range $\lambda 1a$, the cascade effect can be induced at the place of inspection.

The patterns formed from INK1 and INK2 may take any form, as long as they spatially overlap partially or fully. In one embodiment, one of the patterns is in the form of a logo, letter or symbol, and the other one is in the form of a regular arrangement made from fine-printed circles, rectangles, or vertical or horizontal lines.

The area of overlap of the two patterns is not particularly limited, as long as it is not the total area occupied by PAT1 and PAT2. The area of overlap is preferably 5% or more, more preferably 10% or more, but preferably 80% or less, more preferably 60% or less, of the total area occupied by PAT1 and PAT2.

The total area occupied by PAT and PAT2 (PAT1+PAT2) relative to the total area of the substrate area is preferably 50% or less, more preferably 20% or less.

The patterns PAT1 and PAT2 may overlap in one area only (as explained above for the letter "X"), but may also overlap in more than one area, such as for example in two, three, four, five or even more areas. In one embodiment, the areas of overlap are symmetrically arranged on a substrate, whereas in another embodiment the areas of overlap are not provided arranged.

EXAMPLES

The following Example is given for illustrative purposes only, and the present invention is not limited to the Example.

To illustrate the cascade effect, Lumogen® F Yellow 083 (BASF) (lum 1) and Lumogen® F Orange 240 (BASF) (lum 2) were employed. Their spectroscopic emission and excitation properties are shown in FIGS. 2 and 3 as measured on a Horiba Fluorolog-III spectrofluorometer.

The yellow dye (lum 1) acts as donor. Its emission spectrum shows two overlapping peaks at ca. 530 and 550 nm when excited at 480 nm. 530 nm is exactly one excitation peak of the orange dye (acting as acceptor, lum2) which emits at 580 nm when excited at 530 nm.

In consequence, under e.g. 400 nm excitation, the orange dye alone will be little excited, as 400 nm is not within $\lambda_{2a}$ (intensity of emission ~$1\times10^7$ units). Conversely, if the orange acceptor dye is in close contact with the yellow donor dye, in the pattern overlap regions, the emission of the donor dye at 530 nm in the region $\lambda_{1e}$ (emitting 4 times higher as compared to the orange acceptor dye, at ~$4\times10^7$, when excited at 400 nm) excites the orange dye, as $\lambda_{1e}$ (around 530 nm) overlaps with $\lambda_{2a}$, thus inducing the fluorescence of the orange dye by cascade effect.

The above demonstrates that by a suitable overlap of the 2 patterns which provide vicinity/proximity of the donor dye and the acceptor dye, it is possible to obtain an excitation/emission behavior that cannot be achieved by a combination of luminescent dyes wherein no cascade effects occurs, in particular for a specific combination of excitation wavelength outside $\lambda_{2a}$ and a detection within $\lambda_{2e}$.

INK1 and INK2 as described above were formulated. The first ink INK1 was obtained by adding 0.12 wt.-% of Lumogen® F Yellow 083 (lum1) to the blank preparation. Such low weight % of dye guarantees that INK1 is practically invisible to the naked eye when applied and dried. The second ink INK2 was obtained by adding to the blank 1.23 wt.-% of Lumogen® F Orange 240 (lum 2). The patterns printed with INK2 were visible to the naked eye under conventional lighting conditions (e.g. sunlight or in conventional room lighting) and were imaged in conventional lighting using a PMVS (Public Machine Vision System, such as a smart-phone, tablet, smart-camera, camera/computer, scanner/computer, etc.), whereas the ones printed with INK1 remained invisible under such lighting.

Samples having a wet film deposit of 12 μm thickness were then prepared, using a K Control Coater from RK Print Coat Instruments using, using the HC2 coating bar, on a suitable white substrate (e.g. the white part of LENETA N2C-2 substrates), followed by drying at room temperature. Three samples were prepared:
1. Sample1 with INK1 only
2. Sample2 with INK2 only
3. Sample3 with INK1 followed by INK2 further to ink 1 drying (the reverse was also tested and gave similar results)

All three samples were then imaged using a PMVS in reflection mode and using an SMVS (Secure Machine Vision System, i.e. a dedicated security device) sensitive in the 610-900 nm wavelength range, under blue illumination (around 450 nm) and green illumination (around 530 nm). Optionally the samples were also imaged with an SMVS sensitive in the green (around 530 nm) region under blue illumination, to reveal only the area printed with INK1 (irrespective of the overlap). From these different images, intensities were extracted in order to determine if the cascade effect could be observed in the overlap region, if the PMVS could read the prints with INK2 (visible) and to determine whether prints with INK1 remained invisible to the naked eye.

Then, the inks were used to print a dual pattern mark as the one represented in FIG. 6.

At the top left of FIG. 6, a grey-scale picture of the mark acquired using a PMVS in reflection mode shows only the orange QR code obtained from INK2. This code could be decoded using standard QR code reading algorithms to extract product or document information.

At the bottom left of FIG. 6, the picture of the fluorescence of the mark, obtained using a SMVS sensitive in the red part of the spectrum and with a green illumination around 530 nm shows a QR code identical to the image in the top left of FIG. 6. This is because the weak excitation of INK1 in green at 530 nm (see FIG. 2) makes it non-detectable. This allows using the SMVS for decoding the information content of the QR as well, without requiring an additional device sensitive in the visible.

At the top right of FIG. 6, another fluorescence image obtained using a SMVS sensitive in green and under illumination in blue reveals only the pattern printed with INK1 that is invisible in the top left and bottom left, because INK2 does not emit in the green part of the spectrum observed here. In the example, the pattern 1 is a filled cross. Such an imaging configuration is not strictly required for authentication purposes (i.e. a typical authentication operation will not comprise the taking of such an image under the indicated conditions) but could be advantageously implemented for quality control of the invisible mark printing process.

At the bottom right of FIG. 6, a picture of the fluorescence of the dual mark using the same SMVS sensitive in red but with blue illumination around 450 nm exhibits the full complexity of the synergistic security mark. Here both INK1 and INK2 patterns are slightly visible and also reveal a higher intensity at the overlap of the two patterns produced by the cascade effect.

FIG. 4 shows another example of a two-pattern arrangement. Pattern 1 is referred to as PAT1 in the figure and made from INK1, and resembles a QR code (QR stands for Quick Response). In this example, INK1 is formulated such as to be visible under conventional lighting by the naked eye after printing. The code can for instance be read (i.e. imaged, identified and data processed for decoding) by a mobile phone. Pattern 2, referred to as PAT2, is made from INK2 and is in the form of a filled circle in the example. In this example, INK2 is formulated to not be visible under normal daylight by the naked eye after printing, but can be excited to luminesce.

FIG. 5 shows the observed emission of the pattern arrangement shown in FIG. 4 under different illumination and observation conditions. As shown in the image at the top left of FIG. 5, which assumes irradiation with a broad-band source of illumination at an intensity of a well lit room or in sunlight over its spectrum, the QR code visible under daylight by the naked eye is seen only (PAT1 made from INK1). In the image at the top right of FIG. 5, it is shown that with blue illumination, only the QR code is seen when observed in the green wavelength range (corresponding to $\lambda 1e$), which is caused by the fluorescence of INK1 (i.e. in the example $\lambda 1a$ is in the blue wavelength region, $\lambda 1e$ is in the green wavelength region). Next, in image at the bottom left of FIG. 5, the luminescence of INK2 when observed in the red wavelength range is shown upon illumination in the green (i.e. in the example $\lambda 2a$ is in the green wavelength region, and $\lambda 2e$ is in the red wavelength region). In the image in the bottom right of FIG. 5 the cascade effect is visible in the overlap of the two patterns when observed in the red wavelength range $\lambda 2e$ upon irradiating in the blue wavelength range ($\lambda 1a$).

FIG. 7 is another example of a security element similar to the ones shown in FIG. 5 and FIG. 6. The conditions and choice of inks are like in the example of FIG. 5, i.e. the QR code as a first pattern PAT1 is printed with an INK1 chosen to be visible, and the second pattern PAT2 is printed with an INK2 chosen to be invisible. The only difference to FIG. 5 is that the second pattern PAT2 is in the form of a plurality of disjoint elements, e.g. several geometric shapes, like triangles, rectangles, crosses etc. Notably, again the cascade effect is only observed in the areas of overlap.

The above examples are only intended to be illustrative but are not limiting. The inks can be chosen in any suitable or desirable way, as long as they are chosen to enable the cascade effect in the area of overlap. In the examples above, one ink was visible and the other was not. However, both inks can be chosen to provide visible markings, or both can be chosen to provide invisible markings. Furthermore, the shapes or arrangements of pattern elements can be chosen in any suitable or desirable way. In the above examples, one pattern was a QR code and the other a specific geometric shape. However, any form of code can be chosen, and both markings may contain coded information. Equally, also both patterns may be comprised of geometric shapes that do not code any information.

Authenticating Method and System

Generally, the excitation wavelengths will be in the ranges $\lambda_{1a}, \lambda_{2a}$ but it should be noted that the one or more excitation wavelengths used to excite the donor do not have to include the excitation maximum of the donor. In order to make the analysis of the printing ink for the counterfeiter more difficult, it can be rather of advantage to excite the donor dye or pigment with one or more wavelengths that do not include the excitation maximum.

In accordance with an embodiment of the present invention, the printing inks of any of the previously described embodiments are used for forming an authentication mark (a security element) comprising two distinguishable patterns on an article, like in the examples of FIGS. 4 to 7. The printing can be done in any suitable and desirable way that makes use of the inks, e.g. by ink jet printing, intaglio, letterpress etc. Consequently, an article carrying such an authentication mark also constitutes an embodiment of the present invention. The articles for receiving a mark can be chosen in any suitable and desirable way, e.g. be commercial articles for sale, such as bottles (where the mark may be printed on the bottle itself or a label attached to a bottle) or packaging for goods that are to be authenticated, like tobacco products, alcoholic beverages, perfume or the like, but also value articles like postage stamps, bank notes or similar value documents.

The present invention may thus relate to a method for authenticating a marking by irradiating with electromagnetic radiation within the range $\lambda 1a$ for deciding whether that marking is an authentic security element produced as described above. The method comprises analyzing an electromagnetic radiation response originating from an area of said marking wherein there is an overlap of PAT1 and PAT2 in a wavelength range $\lambda 2e$ and determining whether the radiation response fulfills a predetermined criterion associated with a cascade effect according to which excitation in the excitation wavelength range $\lambda 1a$ of DYE1 causes emission in the emission wavelength range $\lambda 2e$ of DYE2 in the second material INK2 in the area of spatial overlap, and deciding that the marking is authentic if the predetermined criterion is fulfilled.

An embodiment of an authentication method may thus comprise irradiating the authenticating mark or security element present on the article with electromagnetic radiation falling in the wavelength range $\lambda_1 a$ (e.g. with a narrowband source, or through an appropriate filter) to cause excitation of the first luminescent dye/pigment, and examining a criterion associated with the presence or absence of emission in the wavelength range $\lambda_{2e}$ at the area(s) where PAT1 and PAT2 overlap. The criterion for deciding whether or not a cascade effect is present can be made in any suitable or desirable way, e.g. by detecting the level of radiation in the wavelength range $\lambda_{2e}$ and comparing a measure of the detected level (e.g. the average level) with a predetermined range, where presence is decided if the detected level falls within the range.

FIG. 9 shows a flow chart of an authenticating method embodiment of the invention. In a first step S9-1 the mark is irradiated with electromagnetic radiation falling within the excitation wavelength range $\lambda_{1a}$ of the first luminescent dye. Step S9-2 comprises detecting an electromagnetic radiation emission response from an area of the mark wherein PAT1 and PAT2 overlap. In step S9-3 a decision process is conducted for deciding whether the electromagnetic radiation emission response fulfils a criterion associated with presence of the cascade effect. If the criterion is fulfilled, then the mark is declared to be authentic (S9-4) and otherwise it is declared to be inauthentic (S9-5).

A system for authenticating a marking for deciding whether said marking is an authentic security element as described above may comprise an electromagnetic radiation source for irradiating the marking with electromagnetic radiation comprising a wavelength within the range $\lambda 1a$. Furthermore an analyzer is provided for analyzing an electromagnetic radiation response from the marking in a wavelength range comprising $\lambda 2e$ and determining whether the radiation response fulfills a predetermined criterion associated with a cascade effect according to which excitation in the excitation wavelength range $\lambda 1a$ of the first luminescent dye or pigment DYE1 causes emission in the emission wavelength range $\lambda 2e$ of the second material INK2. Finally, an authenticator is provided for deciding that the marking is authentic if the predetermined criterion is fulfilled.

FIG. 10 shows a schematic representation of an example of a system (e.g. a SMVS) for authenticating a mark on an article, i.e. to determine whether or not that mark was printed using the above described printing inks. The system comprises an electromagnetic source 10-1 for irradiating the mark 10-2 (provided on article 10-3) with electromagnetic radiation 10-4 falling at least within the excitation wavelength range $\lambda_{1a}$ of the first luminescent dye or pigment. A detector 10-5 is provided for detecting an electromagnetic radiation response in the wavelength range $\lambda 2e$ 10-6 from the mark. A processor 10-7 is provided for receiving the detection information from the detector 10-5 and for performing a decision process for deciding whether the electromagnetic radiation response fulfils a criterion associated with presence of the cascade effect. The processor 10-7 is also arranged for determining the mark as being authentic if the decision process indicates that the mark 10-2 fulfils the criterion.

The criterion can be chosen in any suitable or desirable way. For example, it can consist in establishing whether or not there is presence of emission in the wavelength range $\lambda_{2e}$. This can be done by irradiating the mark under test with radiation in the range $\lambda_{1a}$, digitally imaging a region of the article in which the marking under test is present while filtering the radiation from the mark in a desired range associated with $\lambda_{2e}$. The criterion can then comprise simply determining whether the image contains more than a predetermined threshold number of non-zero pixels (i.e. pixels with a value larger than zero, i.e. other than black), where the presence of the cascade effect is decided if the threshold number is exceeded. The threshold number can be chosen as any number of zero or larger.

As can be seen, the authentication method and system can be very simple and do not necessarily require significant knowledge of the shape, position or composition of the authentic security elements.

Preferably, the authentication method is such that it comprises determining an intensity value associated with said emission wavelength range $\lambda_{2e}$. The criterion can then comprise comparing the determined intensity value with a predetermined intensity range that corresponds to the properties of an authentic security element, e.g. based on the specific concentration of donor material and acceptor material in the authentic inks. The intensity value can be defined and calculated in any suitable or desirable way. For example, the intensity can be measured with a dedicated measurement device directed at the overlap area of the first and second patterns, such as a photometer. However, it is also possible to derive an intensity value from a pixel image, e.g. by averaging the pixel values of pixels exceeding a specific threshold when the image is filtered according to $\lambda_{2e}$, or by averaging the pixel values of all pixels associated with the overlap area of the first and second patterns.

Preferably, the method and system will take into account the area of overlap of the patterns, e.g. by having stored data on the first and second pattern as well as the overlap of authentic security elements. The method and system can then identify the overlap area in taken images, in order to e.g. provide the above mentioned pixel averaging in the overlap area.

According to another preferred embodiment, the marking under test is irradiated with electromagnetic radiation of a first wavelength and with electromagnetic radiation of a second wavelength different from the first wavelength. For example, the mark can first be irradiated with the first wavelength and then the second, or vice versa. The predetermined criterion can then be associated with a relative intensity between a response in the emission wavelength range $\lambda 2e$ of the second material INK2 at the first wavelength and at the second wavelength. For example, a ratio of an intensity value of the overlap area in the emission wavelength range $\lambda 2e$ when irradiated with the first wavelength and an intensity value of the overlap area in the emission wavelength range $\lambda 2e$ when irradiated with the second wavelength can be compared with a range of ratios measured for authentic security elements. For example, the first wavelength can be chosen in the range of $\lambda 1a$, while the second wavelength can be chosen in the range of $\lambda 2a$.

According to another embodiment, the method and system for authentication are arranged for comparing an electromagnetic radiation response from the area of overlap with an electromagnetic radiation response from a different area than the area of overlap. Preferably, the irradiation wavelength is the same for the two responses from the two different areas. For example, the comparison can be against the background in which neither the first nor the second pattern are present. However, preferably the different area is an area belonging to one of the first pattern PAT1 and the second pattern PAT2.

The advantage of considering a relative intensity is that relative values are insensitive to the absolute concentration of the dyes in the respective inks or their application amounts, and equally effects of ageing, both in the ink and the detector, as well as problems of calibration in the detector, all become irrelevant for the authentication.

The criterion for deciding whether the cascade effect is present or not can be as described in any one of the above described examples. However, it is to be noted that these criteria can also be cumulated to thereby form sub-criteria or conditions that are considered together for deciding on the overall criterion. For example, several such conditions can be examined and the decision logic can be such that presence of the cascade effect is decided if m of n conditions are met, where n is the total number of conditions examined and m can be selected in the range $0 < m \leq n$.

According to a further example, the irradiating step S9-1 and the electromagnetic source 10-1 can be arranged in such a way that an irradiation spectrum (i.e. the distribution of electromagnetic radiation that is irradiated onto the mark) of predetermined shape $I(\lambda)$ is generated, and the criterion is associated with the predetermined shape $I(\lambda)$. In other words, the criterion depends on determining whether one or more predetermined characteristics are present in the electromagnetic radiation emission response from the mark 10-2, where the characteristics are associated with the specific irradiation spectrum $I(\lambda)$ applied to the mark 10-2. The characteristics can be defined in terms of any suitable parameter that can be determined from the electromagnetic radiation emission response, such as the signal strength at predetermined wavelength values and on predetermined regions of the marks such as the overlap and/or PAT1 and/or PAT2 regions, the integrated signal strength over a predetermined wavelength range, the change in signal strength over a predetermined wavelength range etc. The criterion can then be chosen in any suitable or desirable way by comparing the one or more of the characteristics with one or more predetermined conditions, e.g. a range condition, a threshold condition, etc.

The behavior of a mark in terms of the electromagnetic radiation emission response in predetermined regions can be considered the "signature" of the mark, and this signature can be compared with a predetermined signature that is to be expected for an authentic mark, i.e. a mark that was printed with the two inks described previously. In other words, the criterion is chosen to establish whether or not a signature is authentic.

As already mentioned, the authentic signature depends on the shape $I(\lambda)$ of the irradiation spectrum. According to a preferred embodiment, the authentication method can be performed in such a way that at least two different irradiation spectra of different shapes $I_1(\lambda)$ and $I_2(\lambda)$ are generated by the electromagnetic irradiation source, and the criterion of step S9-3 is associated with the first and second shapes $I_1(\lambda)$ and $I_2(\lambda)$. In other words, the authentication comprises testing whether not only one predetermined signature related to a corresponding irradiation spectrum is present, but also if a second different signature is present that is related to a corresponding different irradiation spectrum. In this way, the authentication reliability is increased, as even if a counterfeiter is able to compose a set of two inks that can mimic the behavior of the authentic inks on one of the other pattern and on the overlap for one irradiation spectrum, it is very difficult to compose inks that will again mimic the authentic ink combinations for a different irradiation shape, unless the actual ink compositions are determined. However, a full and detailed analysis of the authentic printing inks is cumbersome and costly, and the necessity for such an analysis therefore acts as a deterrent for counterfeiters and forgers. Moreover, assuming that a counterfeiter was able to reproduce both inks, it is highly improbable that he will, in addition, be able to reproduce the exact printing method and hence the fine tuning of the interface between the two ink layers in the overlap regions which determines the properties of the cascade effect.

The shape $I(\lambda)$ of the spectrum will generally be such that it comprises N peaks, N being an integer of at least one. Preferably, the spectrum has two or more peaks.

The sources comprised in element 10-1 and used in step S9-1 can be chosen in any suitable or desirable way and may comprise one or more of light-emitting diodes, lasers, fluorescent tubes, arc lamps and incandescent lamps Preferably, electromagnetic sources that emit at distinct and mutually different wavelengths are chosen, and where the irradiating step S9-1 comprises successively operating individual ones of a plurality of these sources of electromagnetic radiation that each emit at different wavelengths. For example, a set of different LEDs may be used, each emitting a predetermined spectrum different from an LED of different kind. In this way the predetermined irradiation shape $I(\lambda)$ mentioned above can be generated as a sum of the spectra specific to the individual sources.

The step S9-2 of detecting the electromagnetic radiation emission response from the different regions of the mark can be performed by having a user or a programmed machine hold the mark before a reception window of a detector in a predetermined way. Equally, it may comprise a process of imaging the article and identifying a region of interest in the image, said region of interest comprising the mark, e.g. a predetermined type of code. Such processes are known in the art and are therefore not described in more detail here.

The step S9-2 of detecting the electromagnetic radiation emission response can be performed using any suitable radiation detection device, e.g. a diode or an array of diodes sensitive to electromagnetic radiation. According to a preferred embodiment, the detector 10-5 comprises an imager that outputs intensity values for a set of pixels. According to a further embodiment, the detector comprises only one imager.

The step S9-2 furthermore preferably comprises tuning the detector 10-5 to the emission wavelength range $\lambda_{2e}$ of the acceptor dye, preferably such that one or more of the luminescent emission peaks of the acceptor dye can pass. This can e.g. be achieved by introducing a corresponding electromagnetic radiation filter into the detector, e.g. a filter with a pass band that overlaps with the emission wavelength range $\lambda_{2e}$ and is placed within the optical path. Preferably, the pass band of the filter includes one or more of the luminescent emission peaks of the acceptor dye.

By virtue of the fact that the donor and acceptor dye interact to transfer energy from the donor to the acceptor in the overlap regions, it is possible to simplify the detector arrangement in comparison with a system that would be used for normal luminescent dyes. Namely, as the donor can excite the acceptor dye when the ink is irradiated with electromagnetic radiation in the excitation wavelength range $\lambda_{1a}$ of the donor, it is not necessary to observe the ink at two emission wavelengths, because all radiation reactions can be observed in the emission wavelength range $\lambda_{2e}$ of the acceptor. Expressed differently, if for comparison inks would be considered that respectively include independently fluorescing dyes or pigments, then testing the behavior would require irradiating the inks in wavelength ranges that include each individual excitation range of the two dyes or pigments and observing the reaction at the two different emission wavelength ranges of the two dyes or pigments. Consequently, an authentication system for using such inks is complicated in that it requires different detectors for different emission wavelength ranges. In contrast thereto, by using the inks employed in the present invention, a simplified authentication system structure is possible as one can observe in a single emission wavelength range, despite using two different luminescent dyes or pigments in the inks.

Thus, according to a further embodiment of the invention the decision process S9-3 comprises evaluating a level of the electromagnetic radiation emission response within the emission wavelength range $\lambda_{2e}$ of the acceptor when the mark is irradiated with electromagnetic radiation falling within the excitation wavelength range $\lambda_{1a}$ of the donor. According to a preferred embodiment, the decision process S9-3 furthermore comprises evaluating an intensity level of the electromagnetic radiation emission response within the emission wavelength range $\lambda_{2e}$ of the acceptor when the mark is irradiated with electromagnetic radiation not falling within the excitation wavelength range $\lambda_{1a}$ of the donor, where the criterion of decision step S9-3 takes into account a relationship between said evaluated levels. The relationship is preferably the ratio of the evaluated levels, but other linear or non-linear relationships are also exploitable. The irradiation with electromagnetic radiation not falling within the excitation wavelength range $\lambda_{1a}$ of the donor can e.g. be done with electromagnetic radiation falling within the excitation wavelength range $\lambda_{2a}$ of the acceptor. The measuring of a relative relationship between the level of emission to two different excitation wavelengths being irradiated is that the response or signature of the mark becomes insensitive to the absolute concentration of the dyes in the respective inks or their application amounts, and equally effects of ageing, both in the ink and the detector, as well as problems of calibration in the detector, all become irrelevant for the authentication.

It should be noted that the region of interest for measuring the electromagnetic radiation emission response within the emission wavelength range $\lambda_{2e}$ of the acceptor when the mark is irradiated with electromagnetic radiation falling within the excitation wavelength range $\lambda_{1a}$ of the donor is the overlap region between the first pattern PAT1 and the second pattern PAT2. A method of authentication may therefore take into account the geometry of one or both of the first pattern PAT1 and the second pattern PAT2, e.g. as a means for better identifying the overlap region. The method may thus also comprise a step of taking into account the region of spatial overlap of said first pattern PAT 1 and said second pattern PAT2, e.g. in order to identify the region of overlap in an image. The method may furthermore comprise taking into account information encoded in one or both of the first pattern PAT1 and the second pattern PAT2, e.g. a QR code as shown in FIG. 6.

The schematic illustration of the authentication system in FIG. 10 shows the electromagnetic source 10-1 as being separate from the detector 10-5 and the processor 10-7. However, it is equally well possible to provide the source 10-1, the detector 10-5 and the processor 10-7 in one unit.

Furthermore, it is preferable that the system comprises an output 10-8 for giving a user an indication of the authentication decision. For example, the output can comprise one or both of a display giving a visible indication (e.g. green indication for authentic, red indication for inauthentic) and an audio output giving an audible indication.

The processor 10-7 can be provided in any suitable or desirable way for the decision task and the task of determining authenticity. As such, the processor can be embodied by a data processing device with a data processor and a data memory, where said data memory holds software executable by said data processor for providing the indicated functionalities. However, the processor can also be provided by dedicated hardware, or a mixture of hardware and software.

Preferably, the authentication system comprises a portable device that contains a data processor and a camera, wherein the camera, which comprises an imager, forms part of the detector 10-5, and the data processor forms part of the processor 10-7.

Formulation Examples

In the following formulation examples, two different formulations of INK1 were tested based on the following blank properties in order to determine the effect of ink compositions on the observed cascade effect:

1) INK1 with solvent-based blank formulation (FORMULATION blank A) where the dry inks layer is thin and hence pigments are concentrated and much of them are close to the top surface 2) INK1 with UV-curable resin blank formulation (FORMULATION blank B) where dry ink layer is significantly thicker, the pigments are homogeneously distributed along the thickness (z axis) of the print layer, and consequently, the pigment concentration at the surface of the print is reduced as compared to the solvent based ink Both of these inks blanks are used for silk-screen inks and their respective formulations are described in details below. For the formulation example described here, two examples of INK1 using the two different blanks were formulated by adding 15%-weight of Lumilux® green SN-F2Y pigment (Honeywell) as donor. A test patch of each formulation is first silk-screen printed on a suitable white substrate (e.g. the white part of LENETA N2C-2 substrates) with a 90T silkscreen frame, followed by solvent evaporation drying for the FORMULATION A and UV curing for the FORMULATION B.

A typical digital printing ink blank was formulated for INK2 (detailed FORMULATION C below). INK2 is obtained by adding to the blank 0.3%-weight of Lumogen® F Orange 240 fluorescent dye as acceptor.

For the purpose of the example described here, INK2 was applied with a spray device (Nordson Microspray EFD Series 787MS-SS) and using a rectangular mask to produce a distinguishable pattern on top of, and partially covering each of the two silk-screen printed patterns. The spray parameters were adjusted so as to produce a dry film equivalent to the one obtained from a wet film deposit of 12 μm thickness prepared using e.g. a K Control Coater from RK Print Coat Instruments using, e.g., the HC2 coating bar, followed by drying at room temperature.

The efficiency of the cascade effect for the 2 samples was measured with a camera equipped with a lens and a long pass optical filter to transmit mainly the fluorescence from INK2 in a wavelength range between 600 nm and 950 nm, while using a deep blue LED emitting at a peak wavelength of 410 nm for the excitation of INK1 only (INK2 is only very weakly excited at the wavelength range where the deep UV LED is emitting). The average intensity emitted by the patch of INK2 was obtained from stored bitmap images and can be represented, with reference of FORMULATION B at 100%, as follows:

| INK1 blank formulation | Cascade efficiency |
| --- | --- |
| Formulation A (solvent-based) | 152% |
| Formulation B (UV-curable) | 100% |

This example demonstrates that the cascade efficiency can be increased by more than 50% depending on the blank ink formulation of INK1, which comes from a larger amount of the phosphorescent pigment being available at the interface to the layer formed from INK2.

FORMULATION Blank A (Solvent Based):
21.3% NeoCryl B-728, 51.6% Butylglycol acetate, 21.7% Ethyl-3 ethoxypropionate, 0.3% Aerosil 200, 1.3% Byk-053 (anti-foam agent), 3.5% Dowanol DPM, 0.3% BYK-D410. (surfactant)

FORMULATION Blank B (UV-Curable):
31.5 wt.-% Tripropyleneglycol diacrylate monomer, 17.9 wt.-% trimethylolpropane triacrylate, 19.0 wt.-% EBECRYL™ 2959, 11.6 wt.-% EBECRYL™ 80, 2.1 wt.-% TEGO® Airex 900, 1.0 wt.-% GENORAD™ 20, 9.5 wt.-% Calcium carbonate, 2.1 wt.-% Benzil dimethyl ketal and 5.3 wt.-% IRGACURE® 1173.

FORMULATION C (Digital Ink):
87%-weight Methylethylketone, 10.3%-weight of a hydroxyl-containing copolymer made from 84%-weight vinyl chloride and 16%-weight of acrylic acid ester (commercially available from Wacker Chemie under the tradename VINNOL E15/40 A) and 2%-weight of a terpolymer made from 84%-weight vinyl chloride, 15%-weight vinyl acetate and 1%-weight dicarboxylic acid (commercially available from Wacker Chemie under the trade name VINNOL E15/45 M).

The invention claimed is:

1. Security element comprising a first and a second pattern PAT1 and PAT2, which are formed in or on a substrate,
   the first pattern PAT1 being formed by a layer of a first material INK1 applied to a first region of the substrate,
   the second pattern PAT2 being formed by a layer of a second material INK2 applied to a second region of the substrate, said first and second regions of the substrate overlapping,
   wherein
   a part of the first pattern PAT1 overlaps with a part of said second pattern PAT2, so that there are three areas recognizable: an area wherein PAT1, but not PAT2 is provided, an area wherein PAT2, but not PAT1 is provided, and an area wherein both PAT1 and PAT2 are provided such that one of the layer of the first material INK1 and the layer of the second material INK2 is provided on top of another one of the layer of the first material INK1 and the layer of the second material INK2 in the area of the overlap, the first material INK1 comprises a first luminescent dye or pigment DYE1, which upon excitation by electromagnetic radiation falling within an excitation wavelength range $\lambda 1a$ of the first luminescent dye or pigment DYE1 is capable of emitting electromagnetic radiation in at least one first emission wavelength range $\lambda 1e$, and the second material INK2 comprises a second luminescent dye or pigment DYE2, which upon excitation by electromagnetic radiation falling within an excitation wavelength range $\lambda 2a$ of the second luminescent dye or pigment DYE2 is capable of emitting electromagnetic radiation in at least one second emission wavelength range $\lambda 2e$, and said first emission wavelength range $\lambda 1e$ of the first luminescent dye or pigment DYE1 overlaps with the excitation wavelength range $\lambda 2a$ of the second luminescent dye or pigment DYE2, so that upon irradiation with electromagnetic radiation within the excitation wavelength range $\lambda 1a$ of the first luminescent dye or pigment DYE1 the second luminescent dye or pigment DYE2 is excited, in the area of overlap of the patterns, to emit electromagnetic radiation in the emission wavelength range $\lambda 2e$.

2. Security element according to claim 1, wherein the first material INK1 comprises one or both of a first dye and a first pigment other than DYE1, and the second material comprises one or both of a second dye and a second pigment other than DYE2.

3. Security element according to claim 1, wherein one or more of the dyes and pigments present in the first and second materials other than DYE1 and DYE2 are fluorescent and/or phosphorescent.

4. Security element according to claim 1, wherein at least one of the first and second patterns is not visually distinguishable from the substrate.

5. Security element according to claim 4, wherein one of the first pattern and the second pattern is not visually distinguishable from the substrate and the other of the first pattern and the second pattern is visually distinguishable from the substrate.

6. Security element according to claim 1, wherein at least one of the first and second patterns is placed randomly.

7. Security element according to claim 1, wherein the second emission wavelength range $\lambda 2e$ does or does not overlap with the first emission wavelength range.

8. Security element according to claim 1, wherein $\lambda 1a$-max<$\lambda 1e$-max<$\lambda 2e$-max, wherein $\lambda 1a$-max, $\lambda 1e$-max, and $\lambda 2e$-max denote the wavelengths of the excitation and emission peaks in the respective excitation and emission wavelength regions of DYE1 and DYE2.

9. Security element according to claim 1, wherein at least one of the patterns is randomly obtained by spraying INK1 and/or INK2.

10. Security element according to claim 1, wherein DYE1 and DYE2 are both fluorescent materials.

11. Commercial good or value document, comprising the security element according to claim 1.

12. Process for producing a security element as defined in claim 1, comprising the steps of
forming the first pattern by applying the layer of the first material INK1 over the first region of the substrate,
forming the second pattern by applying the layer of the second material INK2 over the second region of the substrate, said first and second regions of the substrate overlapping, wherein a part of the first pattern overlap with a part of said second pattern.

13. Process for producing a security element according to claim 12, wherein the steps of forming the first pattern and/or the second pattern involve the application of INK1 and/or INK2 by a process selected from inkjet printing, offset printing, flexographic printing, lithographic printing, screen printing, gravure printing, intaglio printing and spraying.

14. A method for authenticating a marking including a security element according to claim 1, comprising the steps of:
irradiating the security element with electromagnetic radiation having a wavelength within the wavelength range $\lambda 1a$
analyzing an electromagnetic radiation response within the wavelength range $\lambda 2e$ originating from an area of the security element of said marking wherein a part of PAT1 overlaps with a part of PAT2,
determining whether said radiation response fulfills a predetermined criterion associated with a cascade effect according to which excitation in the excitation wavelength range $\lambda 1a$ of DYE1 causes emission in the emission wavelength $\lambda 2e$ of DYE2, and- deciding that said marking is authentic if said predetermined criterion is fulfilled.

15. A method according to claim 14, comprising determining an intensity value associated with said emission wavelength range $\lambda 2e$ of said DYE2.

16. A method according to claim 14, wherein said marking is irradiated with electromagnetic radiation of a first wavelength and with electromagnetic radiation of a second wavelength different from said first wavelength, and said predetermined criterion is associated with a relative intensity between a response in the emission wavelength range $\lambda 2e$ of DYE2 at the first wavelength and at the second wavelength.

17. A method according to claim 14, further comprising comparing an electromagnetic radiation response from said area of overlap with an electromagnetic radiation response from a different area than said area of overlap.

18. A method according to claim 17, wherein said different area is an area belonging to one of said first pattern PAT1 and said second pattern PAT2.

19. A system for authenticating a marking for deciding whether said marking is an authentic security element according to claim 1, said system comprising:
an electromagnetic radiation source for irradiating said marking with electromagnetic radiation comprising a wavelength within the range $\lambda 1a$,
an analyzer for analyzing an electromagnetic radiation response from said marking in a wavelength range comprising $\lambda 2e$ and determining whether said radiation response fulfills a predetermined criterion associated with a cascade effect according to which excitation in the excitation wavelength range $\lambda 1a$ of the first luminescent dye or pigment DYE1 causes emission in the emission wavelength range $\lambda 2e$ of the second material INK2, and an authenticator for deciding that said marking is authentic if said predetermined criterion is fulfilled.

* * * * *